United States Patent
Shlyunkin et al.

(10) Patent No.: US 11,651,041 B2
(45) Date of Patent: May 16, 2023

(54) METHOD AND SYSTEM FOR STORING A PLURALITY OF DOCUMENTS

(71) Applicant: YANDEX EUROPE AG, Lucerne (CH)

(72) Inventors: Aleksey Valerievich Shlyunkin, Kareliya Resp. (RU); Nikita Denisovich Uvarov, Troitsk (RU); Aleksandr Alekseevich Boymel, Moskovskaya obl. (RU); Aleksandr Nikolaevich Gotmanov, Moskovskaya obl. (RU)

(73) Assignee: YANDEX EUROPE AG, Lucerne (CH)

( * ) Notice: Subject to any disclaimer, the term of this patent is extended or adjusted under 35 U.S.C. 154(b) by 480 days.

(21) Appl. No.: 16/575,139

(22) Filed: Sep. 18, 2019

(65) Prior Publication Data

US 2020/0210484 A1 Jul. 2, 2020

(30) Foreign Application Priority Data

Dec. 26, 2018 (RU) ................................ 2018146458

(51) Int. Cl.
| | |
|---|---|
| *G06F 16/9032* | (2019.01) |
| *G06F 16/903* | (2019.01) |
| *G06K 9/62* | (2022.01) |
| *G06F 16/9038* | (2019.01) |
| *G06F 16/909* | (2019.01) |
| *G06N 20/00* | (2019.01) |

(52) U.S. Cl.
CPC ...... *G06F 16/90328* (2019.01); *G06F 16/909* (2019.01); *G06F 16/9038* (2019.01); *G06F 16/90335* (2019.01); *G06K 9/6223* (2013.01); *G06N 20/00* (2019.01)

(58) Field of Classification Search
CPC ....... G06F 16/328; G06F 16/35; G06F 16/906
See application file for complete search history.

(56) References Cited

U.S. PATENT DOCUMENTS

| | | | | |
|---|---|---|---|---|
| 5,317,507 | A * | 5/1994 | Gallant | G06F 16/355 |
| | | | | 715/260 |
| 6,189,002 | B1 * | 2/2001 | Roitblat | G06F 16/30 |
| 6,651,057 | B1 * | 11/2003 | Jin | G06F 16/334 |
| 7,809,695 | B2 * | 10/2010 | Conrad | G06F 16/30 |
| | | | | 707/692 |

(Continued)

OTHER PUBLICATIONS

Borthakur, HDFS Architecture Guide, retrieved from https://web.archive.Org/web/20181208152533/https://hadoop.apache.org/docs/r1.2.1/hdfs_design.html (Year: 2018).*

*Primary Examiner* — William Spieler
(74) *Attorney, Agent, or Firm* — BCF LLP

(57) ABSTRACT

A method and server for storing documents in a database system is disclosed. The method includes acquiring document data associated with the documents. For each document, a Machine Learning Algorithm is employed to generate respective document vectors based on the respective document data. The method also includes storing the documents as groups of documents in the database system. Each group of documents is associated with a respective group vector. A given group of documents has documents associated with document vectors that are in a spatial proximity to the respective group vector.

20 Claims, 8 Drawing Sheets

(56) References Cited

U.S. PATENT DOCUMENTS

| | | | |
|---|---|---|---|
| 8,682,901 B1 | 3/2014 | Cao et al. | |
| 9,202,249 B1 | 12/2015 | Cohen et al. | |
| 9,767,130 B2 | 9/2017 | Bestler et al. | |
| 10,324,962 B1* | 6/2019 | Todd | G06F 16/31 |
| 10,740,374 B2* | 8/2020 | Deng | G06F 16/24578 |
| 2004/0215606 A1* | 10/2004 | Cossock | G06F 16/337 |
| 2007/0174296 A1* | 7/2007 | Gibbs | G06F 16/27 |
| 2011/0224982 A1* | 9/2011 | Acero | G10L 15/08 |
| | | | 704/236 |
| 2015/0220833 A1* | 8/2015 | Le | G06N 3/08 |
| | | | 706/16 |
| 2016/0070749 A1 | 3/2016 | Sharma et al. | |
| 2016/0085839 A1 | 3/2016 | D'Halluin et al. | |
| 2016/0142475 A1 | 5/2016 | Kathuria et al. | |
| 2017/0103094 A1 | 4/2017 | Hu et al. | |
| 2018/0060145 A1 | 3/2018 | Jaiswal et al. | |
| 2018/0357240 A1* | 12/2018 | Miller | G06F 16/24566 |
| 2019/0065991 A1* | 2/2019 | Guggilla | G06N 20/00 |

* cited by examiner

METHOD AND SYSTEM FOR STORING A PLURALITY OF DOCUMENTS

CROSS-REFERENCE

The present application claims priority to Russian Patent Application No. 2018146458, filed Dec. 26, 2018, entitled "METHOD AND SYSTEM FOR STORING A PLURALITY OF DOCUMENTS", the entirety of which is incorporated herein.

FIELD

The present technology relates to search engine systems in general, and specifically to methods and systems for storing a plurality of documents for generating search results by the search engine systems.

BACKGROUND

Various global or local communication networks (e.g., the Internet) offer users a vast amount of information. The information includes a multitude of contextual topics, such as but not limited to, news and current affairs, maps, company information, financial information and resources, traffic information, games and entertainment-related information. Users use a variety of client devices (desktop, laptop, smartphone, tablets and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

However, it should be noted that the search results should be provided within an acceptable amount of time after a query submission. In other words, not only that search results provided to the user should be relevant, but the response time should also be short enough so that the user stays satisfied with the service provided via the search engine.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Developers of the present technology have realized that grouping documents in a particular manner as described herein, which documents can be provided as search results to a user of a search engine, for example, may allow reducing the response time to a query submitted by the user. For example, grouping documents in this particular manner may allow a quicker identification of relevant documents to the query amongst a large number of documents that are provideable as search results.

Developers of the present technology have also realized that grouping documents in a particular manner as described herein, may allow reducing the number of database servers that are to be accessed during retrieval operations. For example, grouping documents in this particular manner may allow determining a subset of (or a single one) database servers, such as a subset of (or a single one) target database servers amongst all database servers that are storing the documents, that may need to be accessed during retrieval operations. As a result, not only that this helps in reducing processing power dedicated to retrieval operations, this also helps in reducing the volume of access requests to the database servers storing the documents.

Developers of the present technology have also realized that storing documents in groups as described herein may allow, in a sense, to "distribute" the load (of access requests) on high-demand database servers amongst a plurality of database servers. Distributing this load may allow for quicker retrieval operations performed by a server for providing relevant documents to a query submitted by a user of a search engine, for example.

In a first broad aspect of the present technology, there is provided a method of storing a plurality of documents in a database system. The database system is communicatively coupled to a server. The method is executable by the server. The method comprises acquiring, by the server, document data associated with respective documents from the plurality of documents. The method comprises for each document from the plurality of documents, generating, by the server employing a Machine Learning Algorithm (MLA), a respective document vector based on the respective document data. The MLA has been trained based on a given training document-query pair associated with a respective relevance score. The relevance score is indicative of a relevance of a training document in the given training pair to a training query in the given training pair. The NN has been trained to generate (i) a training document vector for the training document and (ii) a training query vector for the training query, such that a proximity value between (i) the training document vector of the training document and (ii) the training query vector of the training query is representative of the relevance score. The method comprises storing, by the server, the plurality of documents as groups of documents in the database system. Each group of documents is associated with a respective group vector. A given group of documents has documents associated with document vectors that are in a spatial proximity to the respective group vector.

In some embodiments of the method, the MLA is a Neural Network (NN).

In some embodiments of the method, the spatial proximity is indicative of the documents in the given group of documents being similar to one another.

In some embodiments of the method, the method further comprises determining, by the server, a respective group vector for each group of documents based on the document vectors associated with the plurality of documents.

In some embodiments of the method, the groups of documents comprise K number of groups, K being a predetermined number.

In some embodiments of the method, the method further comprises grouping the plurality of documents into the groups of documents.

In some embodiments of the method, the grouping comprises executing, by the server, a K-means-type algorithm onto the document vectors associated with the plurality of documents thereby determining the group vectors and the respectively associated groups of documents of the plurality of documents.

In some embodiments of the method, the method further comprises:
receiving, by the server, a current query from an electronic device communicatively coupled to the server, the current query for providing the electronic device with a current document being relevant to the current query;
receiving, by the server, query data associated with the current query;
for the current query, generating, by the server employing the MLA, a current query vector for the current query based on the query data associated with the current query;
determining, by the server, a most similar group vector to the current query vector amongst the group vectors, where the most similar group vector is associated with a target group of documents; and
accessing, by the server, the database system for retrieving documents from the target group of documents.

In some embodiments of the method, the accessing the database system comprises not retrieving documents from other groups of documents other than the target group of documents.

In some embodiments of the method, the database system is configured to host a database separated into a plurality of shards. The storing the groups of documents comprises storing, by the server, the groups of documents as respective shards of the database in the database system, each shard being associated with the respective group vector.

In some embodiments of the method, the database system comprises a plurality of database servers. The storing the groups of documents as the respective shards comprises storing, by the server, the plurality of shards of the database on the plurality of database servers of the database system.

In some embodiments of the method, a given database server of the plurality of database servers stores more than one of the plurality of shards.

In some embodiments of the method, more than one database servers of the plurality of database servers store a given shard from the plurality of shards.

In some embodiments of the method, the plurality of database servers are physically located in more than one geographic locations.

In some embodiments of the method, any two database servers of the plurality of database servers that are geographically close store shards having group vectors that are more similar to each other than group vectors of shards that are stored on any other two database servers of the plurality of database servers that are geographically farther from each other than the two database servers.

In some embodiments of the method, the method further comprises:
receiving, by the server, a current query from an electronic device communicatively coupled to the server, the current query for providing the electronic device with a current document being relevant to the current query;
receiving, by the server, query data associated with the current query;
for the current query, generating, by the server employing the MLA, a current query vector for the current query based on the query data associated with the current query;
determining, by the server, a most similar group vector to the current query vector amongst the group vectors, where the most similar group vector is associated with a target shard from the plurality of shards; and
accessing, by the server, a target database server from the plurality of database servers for retrieving documents of the target shard, the target database server storing the target shard.

In some embodiments of the method, the accessing the target database server comprises not accessing, by the server, other database servers of the database system other than the target database server.

In some embodiments of the method, the method further comprises determining the target database server based on a geographical location of the electronic device and the plurality of database servers.

In some embodiments of the method, the MLA is a Neural Network (NN). the NN comprises a document-dedicated portion and a query-dedicated portion. The document-dedicated portion is configured to generate the training document vector based on document data associated with the training document. The query-dedicated portion is configured to generate the training query vector based on query data associated with the training query. The document-dedicated portion and the query-dedicated portion have been trained together such that the proximity value between (i) the training document vector and (ii) the training query vector is representative of the relevance score.

In a second broad aspect of the present technology, there is provided a server for storing a plurality of documents in a database system. The database system is communicatively coupled to the server. The server is configured to acquire document data associated with respective documents from the plurality of documents. The server is configured to, for each document from the plurality of documents, generate by employing a Machine Learning Algorithm (MLA) a respective document vector based on the respective document data. The NN has been trained based on a given training document-query pair associated with a respective relevance score, and where the relevance score is indicative of a relevance of a training document in the given training pair to a training query in the given training pair. The NN has been trained to generate (i) a training document vector for the training document and (ii) a training query vector for the training query, such that a proximity value between (i) the training document vector of the training document and (ii) the training query vector of the training query is representative of the relevance score. The server is configured to store the plurality of documents as groups of documents in the database system. Each group of documents is associated with a respective group vector. A given group of documents has documents associated with document vectors that are in a spatial proximity to the respective group vector.

In some embodiments of the server, the MLA is a Neural Network (NN).

In some embodiments of the server, the spatial proximity is indicative of the documents in the given group of documents being similar to one another.

In some embodiments of the server, the server is configured to determine a respective group vector for each group of documents based on the document vectors associated with the plurality of documents.

In some embodiments of the server, the groups of documents comprise K number of groups, K being a predetermined number.

In some embodiments of the server, the server is configured to group the plurality of documents into the groups of documents.

In some embodiments of the server, the server configured to group comprises the server configured to execute a K-means-type algorithm onto the document vectors associated with the plurality of documents thereby determining the group vectors and the respectively associated groups of documents of the plurality of documents.

In some embodiments of the server, the server is configured to:
receive a current query from an electronic device communicatively coupled to the server, the current query for providing the electronic device with a current document being relevant to the current query;
receive query data associated with the current query;
for the current query, generate by the server employing the MLA a current query vector for the current query based on the query data associated with the current query;
determine a most similar group vector to the current query vector amongst the group vectors, and where the most similar group vector is associated with a target group of documents; and
access the database system for retrieving documents from the target group of documents.

In some embodiments of the server, the server configured to access the database system comprises the server is configured to not retrieve documents from other groups of documents other than the target group of documents.

In some embodiments of the server, the database system is configured to host a database separated into a plurality of shards. The server configured to store the groups of documents comprises the server configured to store the groups of documents as respective shards of the database in the database system, each shard being associated with the respective group vector.

In some embodiments of the server, the database system comprises a plurality of database servers. The server configured to store the groups of documents as the respective shards comprises the server configured to store the plurality of shards of the database on the plurality of database servers of the database system.

In some embodiments of the server, a given database server of the plurality of database servers stores more than one of the plurality of shards.

In some embodiments of the server, more than one database servers of the plurality of database servers store a given shard from the plurality of shards.

In some embodiments of the server, the plurality of database servers are physically located in more than one geographic locations.

In some embodiments of the server any two database servers of the plurality of database servers that are geographically close store shards having group vectors that are more similar to each other than group vectors of shards that are stored on any other two database servers of the plurality of database servers that are geographically farther from each other than the two database servers.

In some embodiments of the server, server is configured to:
receive a current query from an electronic device communicatively coupled to the server, the current query for providing the electronic device with a current document being relevant to the current query;
receive query data associated with the current query;
for the current query, generate by the server employing the MLA a current query vector for the current query based on the query data associated with the current query;
determine a most similar group vector to the current query vector amongst the group vectors, and where the most similar group vector being associated with a target shard from the plurality of shards; and
access a target database server from the plurality of database servers for retrieving documents of the target shard, the target database server storing the target shard.

In some embodiments of the server, the server configured to access the target database server comprises the server configured to not access other database servers of the database system other than the target database server.

In some embodiments of the server, the server is configured to determine the target database server based on a geographical location of the electronic device and the plurality of database servers.

In some embodiments of the server, the MLA is a Neural Network (NN). the NN comprises a document-dedicated portion and a query-dedicated portion. The document-dedicated portion is configured to generate the training document vector based on document data associated with the training document. The query-dedicated portion being configured to generate the training query vector based on query data associated with the training query. The document-dedicated portion and the query-dedicated portion have been trained together such that the proximity value between (i) the training document vector and (ii) the training query vector is representative of the relevance score.

In a third broad aspect of the present technology, there is provided a method of retrieving documents for a current query. The current query is for providing an electronic device associated with a user with documents that are relevant to the current query. The method is executable by a server. The server is communicatively coupled to the electronic device. The method comprises receiving, by the server, the current query and receiving, by the server, query data associated with the current query. The method comprises, for the current query, generating, by the server, a current query vector for the current query based on the query data associated with the current query. The method comprises determining, by the server, a most similar group vector to the current query vector amongst group vectors. The group vectors are respectively associated with groups of documents. The groups of documents are stored in a database system communicatively coupled to the server. The most similar group vector is associated with a target group of documents. The method comprises accessing, by the server, the database system for retrieving documents from the target group of documents. The target group of documents has documents associated with document vectors that are in a spatial proximity to the most similar group vector.

In some embodiments of the method, the database system comprises a plurality of database servers storing the groups of documents. The accessing the database system comprises accessing, by the server, only the database server storing the target group of documents amongst the plurality of database servers.

In a fourth broad aspect of the present technology, there is provided a server for retrieving documents for a current query. The current query is for providing an electronic device associated with a user with documents that are relevant to the current query. The server is communicatively coupled to the electronic device. The server is configured to receive the current query. The server is configured to receive query data associated with the current query. The server is configured to, for the current query, generate a current query vector for the current query based on the query data associated with the current query. The server is configured to determine a most similar group vector to the current query vector amongst group vectors. The group vectors are respectively associated with groups of documents. The groups of documents are stored in a database system communicatively coupled to the server. The most similar group vector is associated with a target group of documents. The server is configured to access the database system for retrieving documents from the target group of documents. The target group of documents has documents associated with document vectors that are in a spatial proximity to the most similar group vector.

In some embodiments of the server, the database system comprises a plurality of database servers storing the groups of documents. The server configured to access the database system comprises the server configured to access only the database server storing the target group of documents amongst the plurality of database servers.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
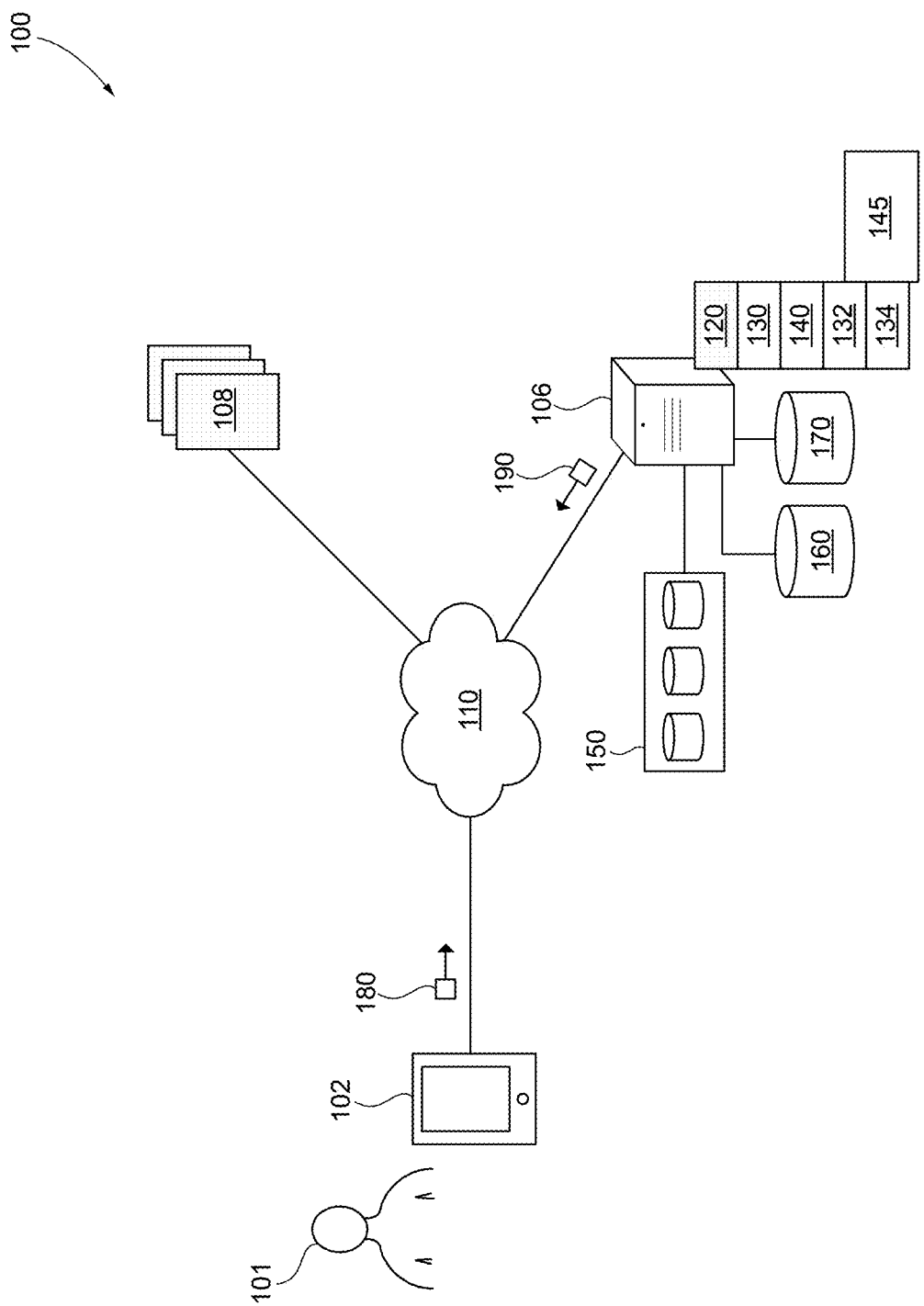
FIG. 1 depicts a schematic diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology.

Broadly speaking, the system 100 may be employed for providing search results to a given user in response to a query submitted thereby. To that end, the system 100 comprises inter alia an electronic device 102 associated with the user 101, a server 106, a plurality of resource servers 108 and a database system 150. For example, the user 101 may submit a given query via the electronic device 102 to the server 106 which, in response, is configured to provide search results to the user 101. The server 106 generates these search results based on information that has been retrieved from, for example, the plurality of resource servers 108 and stored in the database system 150. These search results provided by the system 100 may be relevant to the submitted query. Some functionality of components of the system 100 will now be described in greater detail.

Electronic Device

As mentioned above, the system 100 comprises the electronic device 102 associated with the user 101. As such, the electronic device 102, or simply "device" 102 can sometimes be referred to as a "client device", "end user device" or "client electronic device". It should be noted that the fact that the electronic device 102 is associated with the user 101 does not need to suggest or imply any mode of operation—such as a need to log in, a need to be registered, or the like.

In the context of the present specification, unless provided expressly otherwise, "electronic device" or "device" is any computer hardware that is capable of running a software appropriate to the relevant task at hand. Thus, some non-limiting examples of the device 102 include personal computers (desktops, laptops, netbooks, etc.), smartphones, tablets and the like. The device 102 comprises hardware and/or software and/or firmware (or a combination thereof), as is known in the art, to execute a given browser application (not depicted).

Generally speaking, the purpose of the given browser application is to enable the user 101 to access one or more web resources. How the given browser application is implemented is not particularly limited. One example of the given browser application that is executable by the device 102 may be embodied as a Yandex™ browser. For example, the user 101 may use the given browser application to (i) navigate to a given search engine website, and (ii) submit a query in response to which (s)he is to be provided with relevant search results.

The device 102 is configured to generate a request 180 in response to the user 101 submitting a query. The request 180 may take form of one or more data packets comprising information indicative of the query submitted by the user 101. The device 102 is also configured to receive a response 190. The response 190 may take form of one or more data packets comprising information indicative of search results that are relevant to the submitted query and computer-readable instructions for displaying by the given browser application to the user 101 these search results. How the content of the response 190 is generated in response to the submitted query will be described in greater details herein further below.

Communication Network

The system 100 comprises a communication network 110. In one non-limiting example, the communication network 110 may be implemented as the Internet. In other non-limiting examples, the communication network 110 may be implemented differently, such as any wide-area communication network, local-area communication network, a private communication network and the like. In fact, how the communication network 110 is implemented is not limiting and will depend on inter alia how other components of the system 100 are implemented.

The purpose of the communication network 110 is to communicatively couple at least some of the components of the system 100 such as the device 102, the plurality of resource servers 108 and the server 106. For example, this means that the plurality of resource servers 108 is accessible via the communication network 110 by the device 102. In another example, this means that the plurality of resource servers 108 is accessible via the communication network 110 by the server 106. In a further example, this means that the server 106 is accessible via the communication network 110 by the device 102.

The communication network 110 may be used in order to transmit data packets amongst the device 102, the plurality of resource servers 108 and the server 106. For example, the communication network 110 may be used to transmit the request 180 from the device 102 to the server 106. In another example, the communication network 110 may be used to transmit the response 190 from the server 106 to the device 102.

Plurality of Resource Servers

As mentioned above, the plurality of resource servers 108 can be accessed via the communication network 110. The plurality of resource servers 108 may be implemented as conventional computer servers. In a non-limiting example of an embodiment of the present technology, a given one of the plurality of resource servers 108 may be implemented as a Dell™ PowerEdge™ Server running the Microsoft™ Windows Server™ operating system. The given one of the plurality of resource servers 108 may also be implemented in any other suitable hardware and/or software and/or firmware or a combination thereof.

The plurality of resource servers 108 are configured to host (web) resources that can be accessed by the device 102 and/or by the server 106. Which type of resources the plurality of resource servers 108 is hosting is not limiting. However, in some embodiments of the present technology, the resources may comprise electronic documents, or simply "documents", that are representative of web pages.

For example, the plurality of resource servers 108 may host web pages, which means that the plurality of resource servers 108 may store documents representative of web pages and which are accessible by the device 102 and/or by the server 106. A given document may be written in a mark-up language and may comprise inter alia (i) content of a respective web page and (ii) computer-readable instructions for displaying the respective web page (content thereof).

A given one of the plurality of resource servers 108 may be accessed by the device 102 in order to retrieve a given document stored on the given one of the plurality of resource servers 108. For example, the user 101 may enter a web address associated with a given web page in the given browser application of the device 102 and, in response, the device 102 may access a given resource server hosting the given web page in order to retrieve the document representative of the given web page for rendering the content of the web page via the given browser application.

A given one of the plurality of resource servers 108 may be accessed by the server 106 in order to retrieve a given document stored on the given one of the plurality of resource servers 108. The purpose for the server 106 accessing and retrieving documents from the plurality of resource servers 108 will be described in greater details herein further below.

Server

The system 100 comprises the server 106 that may be implemented as a conventional computer server. In an example of an embodiment of the present technology, the server 106 may be implemented as a Dell™ PowerEdge™ Server running the Microsoft™ Windows Server™ operating system. Needless to say, the server 106 may be implemented in any other suitable hardware and/or software and/or firmware or a combination thereof. In the depicted non-limiting embodiment of present technology, the server 106 is a single server. In alternative non-limiting embodiments of the present technology, the functionality of the server 106 may be distributed and may be implemented via multiple servers.

Generally speaking, the server 106 is under control and/or management of a search engine provider (not depicted) such as, for example, an operator of the Yandex™ search engine. As such, the server 106 may be configured to host a given search engine for performing one or more searches responsive to queries submitted by users of the given search engine.

For example, the server 106 may receive the request 180 from device 102 indicative of the query submitted by the user 101. The server 106 may perform a search responsive to the submitted query for generating search results that are relevant to the submitted query. As a result, the server 106 may be configured to generate the response 190 indicative of the search results and may transmit the response 190 to the device 102 for display of the search results to the user 101 via the given browser application.

The search results generated for the submitted query may take many forms. However, in one non-limiting example of the present technology, the search results generated by the server 106 may be indicative of documents that are relevant to the submitted query. How the server 106 is configured to determine and retrieve documents that are relevant to the submitted query will become apparent from the description herein.

The server 106 is also configured to execute a crawler application 120. Broadly speaking, the crawler application 120 is used by the server 106 in order to "visit" resources accessible via the communication network 110 and to retrieve/download them for further use. For example, the crawler application 120 may be used by the server 106 in order to access the plurality of resource servers 108 and to retrieve/download documents representative of web pages hosted by the plurality of resource servers 108.

It is contemplated that the crawler application 120 may be periodically executable by the server 106 in order to retrieve/download documents that have been updated and/or became accessible over the communication network 110 since a previous execution of the crawler application 120.

The server 106 is also configured to employ a Neural Network (NN) 130. Generally speaking, a given NN consists of a group of interconnected artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus, rather than trying to determine complex statistical arrangements or mathematical algorithms for a given situation; the given NN tries to provide an "intuitive" answer based on a "feeling" for a situation.

NNs are commonly used in many such situations where it is only important to know an output based on a given input, but exactly how that output is derived is of lesser importance or is unimportant. For example, NNs are commonly used to optimize the distribution of web-traffic between servers, data comparison and processing, clustering, including filtering, vector embedding, and the like.

To summarize, the implementation of the NN 130 by the server 106 can be broadly categorized into two phases—a training phase and an in-use phase. First, the NN 130 is trained in the training phase. Then, once the NN 130 knows what data to expect as inputs and what data to provide as outputs, the NN 130 is actually employed by the server 106 using in-use data in the in-use phase.

It is contemplated that in some embodiments of the present technology, the NN 130 may be embodied as a fully-connected NN. This means that neuron layers of the NN 130 may be connected such that every neuron of a given layer is connected to every neuron of a next layer. It is contemplated that the NN 130 may also be embodied as a feed-forward-type NN, a auto-encoder-type NN, and the like.

The server 106 may use the NN 130 to generate document vectors for documents that have been retrieved by the crawler application 120. It is contemplated that document vectors generated for documents may be used by the server 106 for an efficient storage of these documents in the database system 150.

The server 106 may also use the NN 130 to generate query vectors for queries that are submitted to the server 106. It is contemplated that query vectors generated for queries that are submitted to the server 106 may be used by the server 106 for an efficient retrieval of potentially relevant documents from the database system 150.

How the server 106 is configured to train the NN 130 and employ the NN 130 for generating document vectors as well as query vectors, as mentioned above, will be described in greater details herein further below. However, prior to describing how the NN 130 is trained and then used by the server 106, the database system 150, a search engine data repository 160 and an operational repository 170 will be described in turn.

Database System

Figure 2:
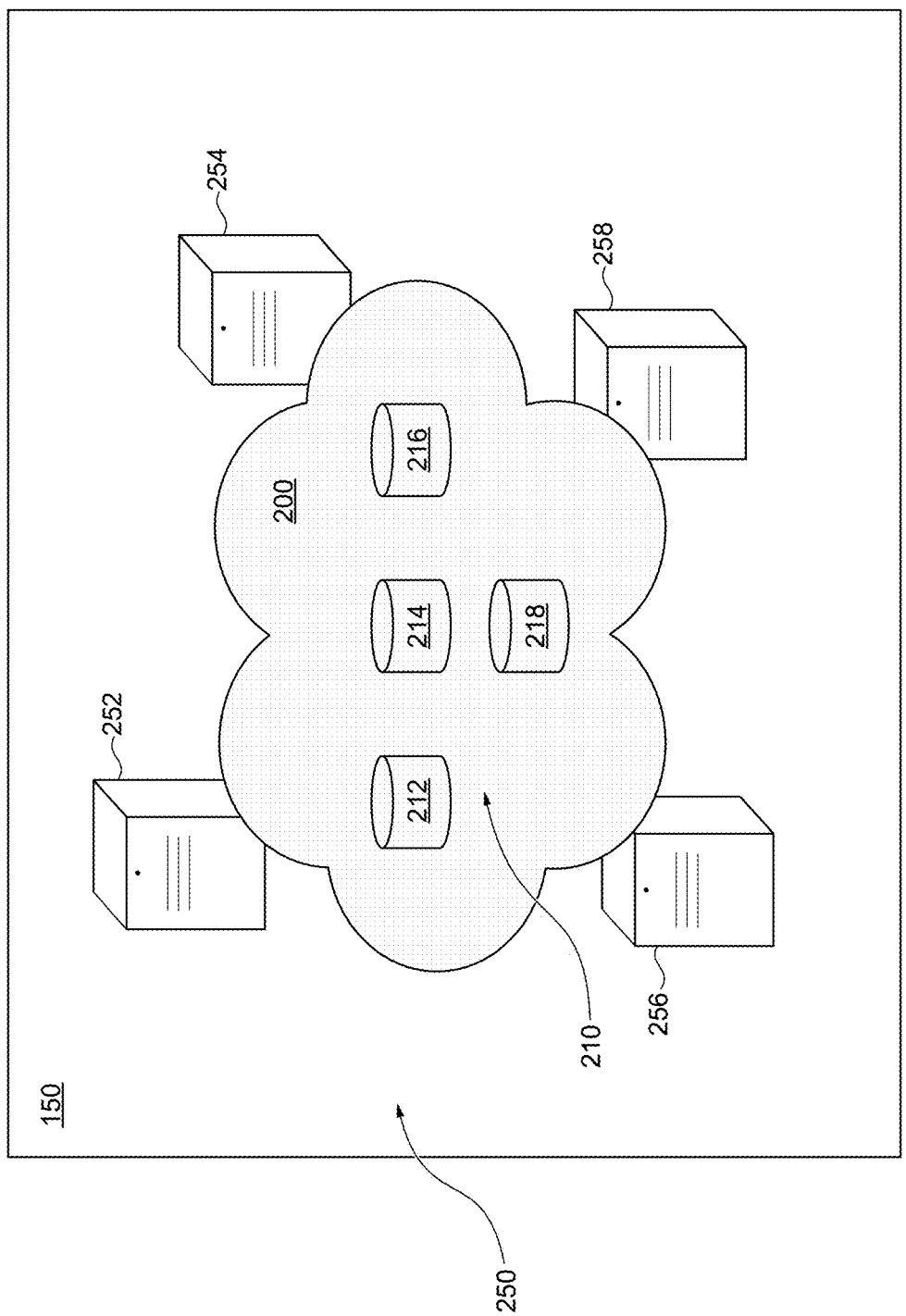
FIG. 2 depicts a schematic diagram of a database system of FIG. 1 in accordance with non-limiting embodiments of the present technology.

With reference to FIG. 2, the database system 150 is communicatively coupled to the server 106. Generally speaking, the database system 150 is configured to store a large number of documents that have been retrieved by the crawler application 120. More specifically, the server 106 is configured to store this large number of documents in the database system 150 in a grouped manner—that is, the server 106 is configured to store documents in the database system 150 as groups of documents.

Also, the server 106 is configured to store groups of documents in association with respective "IDs". As it will be described below in greater details, this "ID" for a given group of documents may be in a form of a vector that the server 106 is capable of generating based on documents that are within the given group of documents.

As it will also become apparent from the present description, the way that the server 106 determines groups of documents and stores them in the database system 150 in association with the respective "IDs" may allow a more efficient use of the database system 150 during document retrieval operations.

It is contemplated that in some embodiments of the present technology, the database system 150 may be configured to host a database 200. Broadly speaking, the database 200 may be a structured collection of data about documents and is available to the server 106 for identifying potentially relevant documents for a submitted query.

It is contemplated that the database system 150 may be formed from a plurality of database servers 250 that host the database 200. In the non-limiting example illustrated in FIG. 2, the plurality of database servers 250 comprises a first database server 252, a second database server 254, a third database server 256 and a fourth database server 258. The plurality of database servers 250 forming the database system 150 may be communicatively coupled to the server 106 for allowing the server 106 to access the database 200. Although the plurality of database servers 250 is illustrated as including only four database servers, it is contemplated that the plurality of database servers 250 forming the database system 150 may comprise a different number of database servers, without departing from the scope of the present technology.

It is contemplated that the plurality of database servers 250 may be located in different geographic locations. In one non-limiting example, the first database server 252 and the second database server 254 may be located near a first geographic location, while the third database server 256 and the fourth database server 258 may be located near a second geographic location.

In some embodiments of the present technology, the database 200 hosted by the database system 150 may be "sharded", or in other words, separated into a plurality of shards 210. This means that the structured collection of data hosted by the database system 150 may be partitioned and where each partition of the structure collection of data corresponds to a given shard of the plurality of shards 210.

As illustrated, the database 200 may be composed of a first shard 212, a second shard 214, a third shard 216 and a fourth shard 218. For example, each one of the first shard 212, the second shard 214, the third shard 216 and the fourth shard 218 may be stored in the database system 150 as a respective group of documents. Although the plurality of shards 210 is illustrated as including only four shards, it is contemplated that the plurality of shards 210 may comprise a different number of shards, without departing from the scope of the present technology.

The server 106 may be configured to generate the plurality of shards 210 (e.g., determine respective groups of documents) of the database 200 and store these shards from the plurality of shards 210 on respective database servers from the plurality of database servers 250.

The server 106 may also be configured to keep track of which shard of the plurality of shards 210 has been stored on which database server of the plurality of database servers 250. To that end, the server 106 may store mapping data 140 (see FIG. 1) which is indicative of which shard of the plurality of shards 210 is stored on which database server of the plurality of database servers 250. For example, the mapping data 140 may include a list of "IDs" associated respective groups of documents (e.g., respective shards of the plurality of shards 210) and data identifying which of the plurality of database servers 250 stores the groups of documents associated with these "IDs".

It should be recalled that these "IDs" may be embodied as vectors generated by the server 106 based on documents within the respective groups of documents. As such, a given record in the mapping data 140 may include (i) a given "ID" in a form of a vector for a given group of documents, and (ii) data identifying a given database server from the plurality of database servers 250. This given record is indicative of that the given group of documents associated with the given "ID" is stored on the given database server.

How the server 106 is configured to (i) generate the plurality of shards 210 (e.g., determine respective groups of documents) of the database 200 and (ii) determine which shard is to be stored on which database server of the plurality of database servers 250 will be described in greater details herein further below.

As alluded to above, the server 106 may make use of the database 200 when the server 106 is performing a search for relevant documents in response to a submitted query. During the use of the database 200, the server 106 may be configured to, broadly speaking:

- identify at least one target shard (e.g., at least one target group of documents) amongst the plurality of shards 210 of the database 200 based on the submitted query, where the at least one target shard comprises data for identifying potentially relevant documents for the submitted query;
- use the mapping data 140 in order to identify at least one target database server of the plurality of database servers 250 that hosts the at least one target shard; and
- access the at least one target database server in order to retrieve data from the at least one target shard.

How the server 106 is configured to perform the above-mentioned steps during use of the database 200 will be described in greater details herein further below.

Search Engine Data Repository

Returning to FIG. 1, the server 106 has access to the search engine data repository 160. Broadly speaking, the search engine data repository 160 is configured to store information regarding the search engine of the server 106. Although the search engine data repository 160 is illustrated in FIG. 1 as a separate entity from the database system 150, it is contemplated that the database system 150 may comprise the search engine data repository 160.

For example, the search engine data repository 160 may store information about previously performed searches by the given search engine. In another example, the search engine data repository 160 may store information about previously submitted queries to the server 106 and about documents that are providable by the search engine of the server 106 as search results.

It is contemplated that the search engine data repository 160 may store query data associated with respective queries. Query data associated with a given query may be of different types and is not limiting. For example, the search engine data repository 160 may store query data for respective queries such as, but not limited to:

- popularity of a given query;
- frequency of submission of the given query;
- number of clicks associated with the given query;
- indications of other submitted queries associated with the given query;
- indications of documents associated with the given query;
- other statistical data associated with the given query;
- text associated with the given query;
- number of characters within the given query;
- other textual data associated with the given query; and
- other query-intrinsic characteristics of the given query.

The search engine data repository 160 may also store document data associated with respective documents. Document data associated with a given document may be of different types and is not limiting. For example, the search engine data repository 160 may store document data for respective documents such as, but not limited to:

- popularity of a given document;
- click-through-rate for the given document;
- time-per-click associated with the given document;
- indications of other documents associated with the given document;
- indications of queries associated with the given document;
- other statistical data associated with the given document;
- text associated with the given document;
- other textual data associated with the given document;
- memory size of the given document; and
- other document-intrinsic characteristics of the given document.

Figure 3:
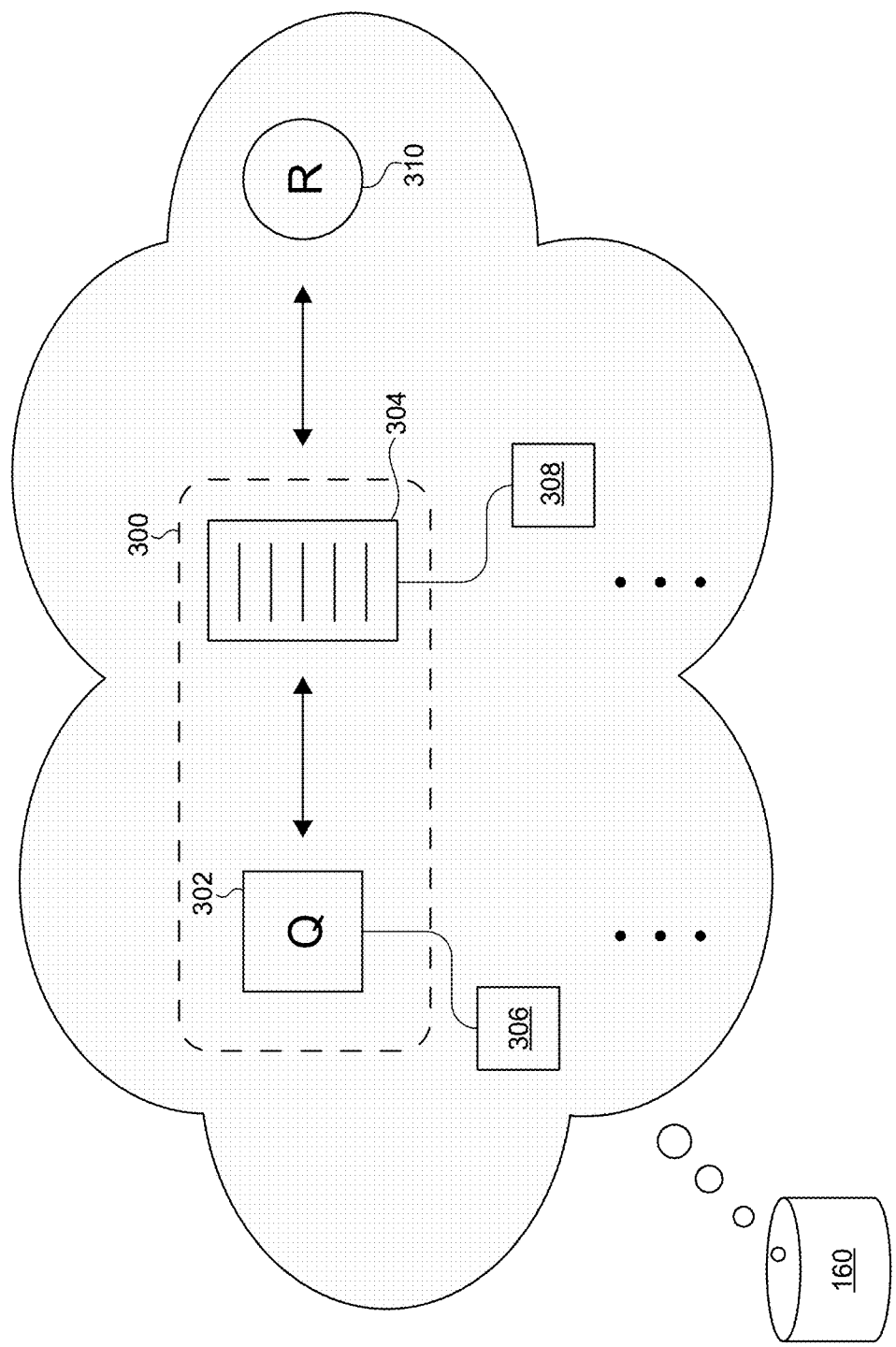
FIG. 3 depicts content stored in a search engine data repository of FIG. 1 in accordance with non-limiting embodiments of the present technology.

It is contemplated that the search engine data repository 160 may also store information in a form of "query-document pairs". For example, with reference to FIG. 3, the search engine data repository 160 may store a large number of query-document pairs similar to a query-document pair 300. The query-document pair 300 comprises a query 302 and a document 304. For example, the query 302 may be a previously submitted query to the server 106, while the document 304 may be a previously provided document by the search engine in response to the query 302.

As explained above, the search engine data repository 160 may store query data associated with respective queries and document data associated with respective documents. For example, the search engine data repository 160 may store the query 302 in association with query data 306, while storing the document 304 in association with document data 308.

It is also contemplated that the search engine data repository 160 may store data indicative of a relevance score for a given query-document pair. A given relevance score for a given query-document pair is indicative of how relevant the document from the given query-document pair is to the query from the given query-document pair. For example, the search engine data repository 160 may store data indicative of a relevance score 310 for the query-document pair 300. The relevance score 310 is indicative of how relevant the document 304 is to the query 302.

How the relevance scores for respective query-document pairs are determined is not limiting. In one example, the relevance scores may be at least partially derived from user-interaction data associated with a respective query-document pair. In another example, the relevance scores may be assessed by human assessors that have been tasked with assessing a relevance of a given document provided thereto in response to a given query provided thereto.

The server 106 may be configured to use the information stored in the search engine data repository 160 as training data for training the NN 130. It is also contemplated that the server 106 may also use the information stored in the search engine data repository 160 during the in-use phase of the NN 130. How the server 106 is configured to use the information stored in the search engine data repository 160 will be described in greater details herein below.

Operational Repository

Returning to FIG. 1, the server 106 has access to the operational repository 170. Broadly speaking, the operational repository 170 may be used by the server 106 in order to store, temporarily or permanently, information that is determined/generated by the server 106 during its operation for future use thereof. Although the operational repository 170 is illustrated in FIG. 1 as a separate entity from the database system 150, it is contemplated that the database system 150 may comprise the operational repository 170 and/or the search engine data repository 160.

Figure 4:
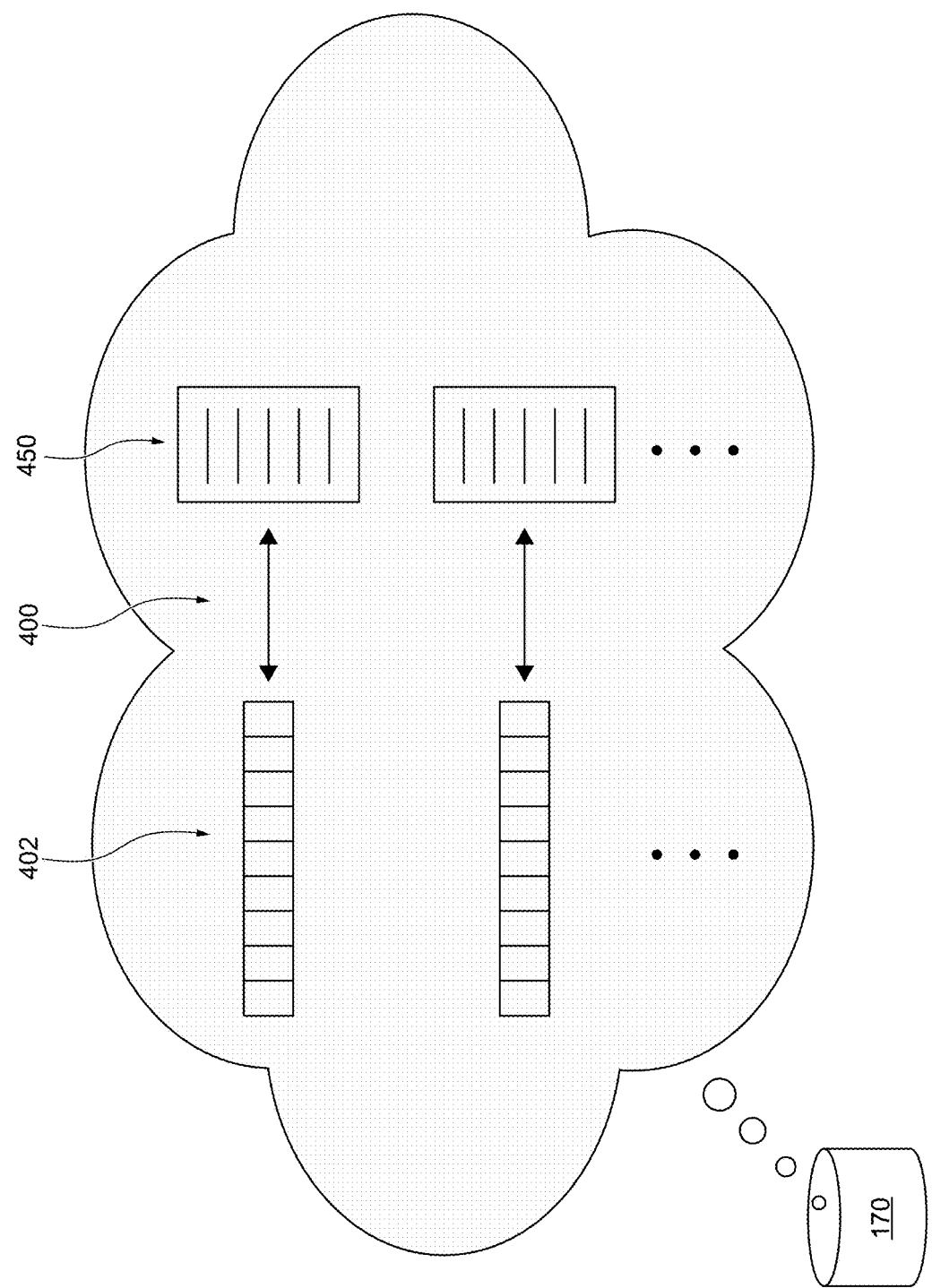
FIG. 4 depicts content stored in an operational repository of FIG. 1 in accordance with non-limiting embodiments of the present technology.

In one non-limiting example depicted in FIG. 4, the operational repository 170 may be used by the server 106 to store, temporarily or permanently, NN-generated data 400 that may be generated by the NN 130 during the in-use phase thereof. The NN-generated data 400 comprises a plurality of document vectors 402, as mentioned above, and the plurality of document vectors 402 is associated with a plurality of documents 450. The plurality of document vectors 402, as it will be described below, are generated by the NN 130 during the in-use phase of the NN 130.

For example, during operation of the server 106, the server 106 may employ the NN 130 (see FIG. 1) for generating, for each one of the plurality of documents 450, a respective document vector from the plurality of document vectors 402. As a result, the server 106 may be configured to store in the operational repository 170, temporarily or permanently, document vectors in association with respective documents based on which they are generated by the NN 130.

It should be noted that the plurality of documents 450 may comprise documents that are retrieved by the crawler application 120 and/or that have been previously provided as search results by the search engine. In one non-limiting example, the plurality of documents 450 may comprise all documents that are potentially providable by the search engine of the server 106 as search results in response to submitted queries.

It is contemplated that the information stored in the operational repository 170 may be used by the server 106 for generating the plurality of shards 210 (e.g. determining groups of documents) of the database 200 (see FIG. 2). It is also contemplated that the information stored in the operational repository 170 may be used for generating "IDs" for groups of documents. It is also contemplated that the information stored in the operational repository 170 may be used by the server 106 for determining which shard of the plurality of shards 210 (e.g., which group of documents) is to be stored on which database server of the plurality of database servers 250. How the information stored, temporarily or permanently, in the operational repository 170 may be used by the server 106 for performing the above-mentioned functionalities of the server 106 will be described in greater details herein further below.

How the server 106 is configured to train the NN 130 during its training phase for generating the plurality of document vectors 402 during its in-use phase will now be described.

Training Phase of NN

Figure 5:
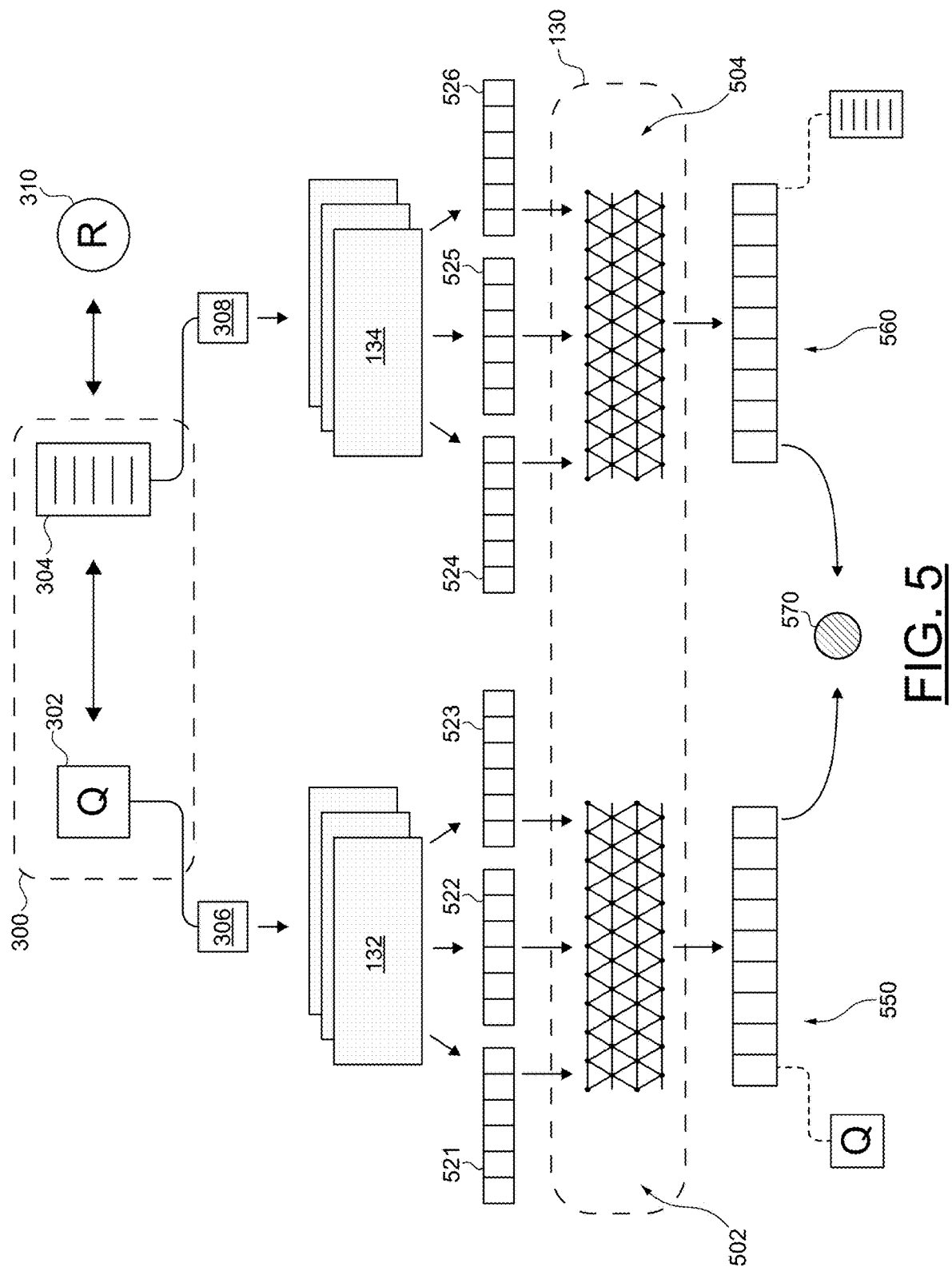
FIG. 5 depicts a schematic diagram of a given training iteration of a Neural Network of a server of FIG. 1 in accordance with non-limiting embodiments of the present technology.

With reference to FIG. 5, there is depicted a given training iteration of the NN 130. Although only one training iteration of the NN 130 is illustrated in FIG. 5, it should be noted that the server 106 may be configured to perform a large number of training iterations similarly to how the server 106 is configured to perform the given training iteration depicted in FIG. 5, without departing from the scope of the present technology.

It should be noted that the NN 130 is trained based on a given training query-document pair. In the non-limiting example illustrated in FIG. 5, the NN 130 is trained based on the query-document pair 300. It is contemplated that each training iteration of the NN 130 may be performed based on a respective query-document pair retrieved by the server 106 form the search engine data repository 160.

It should be noted that the server 106 may be configured to execute a plurality of query vectorization models 132 and a plurality of document vectorization models 134 (also see FIG. 1). Broadly speaking, a given vectorization model is configured to, in a sense, transform "raw data" about an entity into a vector form that is representative of this raw data. As such, the purpose of the given vectorization model is to receive raw data of a given type, process this raw data of the given type, and generate a respective vector for the raw data of the given type.

Models in the plurality of query vectorization models 132 are not particularly limiting. For example, the plurality of query vectorization models 132 may comprise a first given query vectorization model configured for receiving textual data associated with a given query and generating a first given query sub-vector associated with the given query and which is representative of the textual data of the given query. In another example, the plurality of query vectorization models 132 may comprise a second given query vectorization model configured for receiving statistical data associated with a given query and for generating a second given query sub-vector associated with the given query and which is representative of the statistical data of the given query (may also potentially concatenate this "raw" statistical data into a vector form).

Similarly, models in the plurality of document vectorization models 134 are not particularly limiting. For example, the plurality of document vectorization models 134 may comprise a first given document vectorization model configured for receiving textual data associated with a given document and generating a first given document sub-vector associated with the given document and which is representative of the textual data of the given document. In another example, the plurality of document vectorization models 134 may comprise a second given document vectorization model configured for receiving statistical data associated with a given document and for generating a second given document sub-vector associated with the given document and which is representative of the statistical data of the given document (may also potentially concatenate this "raw" statistical data into a vector form).

In some embodiments, the plurality of query vectorization models 132 and the plurality of document vectorization models 134 may comprise at least one common vectorization model.

It should be noted that other potential vectorization models may be used as part of the plurality of query vectorization models 132 and/or the plurality of document vectorization models 134. For example, the other potential vectorization models may include, but not limited to: Deep Structured Semantic Models (DSSMs), bag-of-word-type models, Word2vec-type models, Sent2vec-type models, and the like. Hence, it is contemplated that various vectorization techniques and methods may be used for generating sub-vectors.

As illustrated in FIG. 5, let it be assumed that the plurality of query vectorization models 132 comprises three query vectorization models and that the plurality of document vectorization models 134 comprises three document vectorization models.

As such, the server 106 may use the query data 306 associated with the query 302 as inputs into the plurality of query vectorization models 132. As a result, each of the plurality of query vectorization models 132 outputs a respective query sub-vector based on a respective type of data in the query data 306. For example, the plurality of query vectorization models 132 outputs a first query sub-vector 521, a second query sub-vector 522 and a third query sub-vector 523.

Also, the server 106 may use the document data 308 associated with the document 304 as inputs into the plurality of document vectorization models 134. As a result, each of the plurality of document vectorization models 134 outputs a respective document sub-vector based on a respective type of data in the document data 308. For example, the plurality of document vectorization models 134 outputs a first document sub-vector 524, a second document sub-vector 525 and a third document sub-vector 526.

It should be noted that the first query sub-vector 521, the second query sub-vector 522, the third query sub-vector 523, the first document sub-vector 524, the second document sub-vector 525 and the third document sub-vector 526 are used by the server 106 as inputs into the NN 130 during the given training iteration of the NN 130.

As such, it can be said that the server 106 may employ the plurality of query vectorization models 132 and the plurality of document vectorization models 134, which are configured to process raw data associated with a given query from a given query-document pair and raw data associated with a given document from the given query-document pair, in order to generate training inputs for the NN 130.

It should also be noted that the NN 130 comprises two NN portions, namely a query-dedicated portion 502 and a document-dedicated portion 504. The query-dedicated portion 502 is configured to receive sub-vectors outputted from the plurality of query vectorization models 132. In other words, the query-dedicated portion 502 is configured to receive the first query sub-vector 521, the second query sub-vector 522, the third query sub-vector 523. The document-dedicated portion 504 is configured to receive sub-vectors outputted from the plurality of document vectorization models 134. In other words, the document-dedicated portion 504 is configured to receive the first document sub-vector 524, the second document sub-vector 525 and the third document sub-vector 526.

The query-dedicated portion 502 is configured to generate a training query vector 550 while the document-dedicated portion 504 is configured to generate a training document vector 560. The training query vector 550 is associated with the query 302 and is based on the query data 306, while the training document vector 560 is associated with the document 304 and is based on the document data 308.

Once the training query vector 550 and the training document vector 560 are generated by the query-dedicated portion 502 and by the document-dedicated portion 504, respectively, the server 106 may be configured to determine a proximity value 570 between the training query vector 550 and the training document vector 560. For example, the proximity value 570 may correspond to a "vectorial" distance between the training query vector 550 and the training document vector 560. The proximity value 570 may be indicative of how spatially close the training query vector 550 and the training document vector 560 are to one another.

For example, a "vectorial" distance between vectors may refer to a Euclidian distance between these vectors. In another example, the "vectorial" distance between vectors may refer to a scalar product between these vectors. As such, it is contemplated that the "vectorial" distance may refer to a spatial proximity between two vectors mapped in a vector-space, without departing from the scope of the present technology.

The purpose of training the NN 130 is to condition the NN 130 to generate a respective query vector and a respective document vector such that a respective proximity value is representative of a respective relevance score of a given training query-document pair. In this case, the purpose of training the NN 130 is to condition the NN 130 to generate the training query vector 550 and the training document vector 560 such that the proximity value 570 is representative of the relevance score 310 for the query-document pair 300.

In order to condition the NN 130 to generate the training query vector 550 and the training document vector 560 such that the proximity value 570 is representative of the relevance score 310 for the query-document pair 300, the server 106 may be configured to compare the proximity value 570 against the relevance score 310. Based on this comparison, the server 106 may employ different training techniques for adjusting the connections amongst "neurons" of the NN 130 and thereby conditioning the NN 130. For example, the server 106 may employ backpropagation techniques for adjusting the connections amongst "neurons" of the NN 130 based on the situation encountered during the given training iteration of the NN 130.

As a result, the NN 130 is conditioned during the training phase thereof to (i) receive an input based on query data associated with a given query and to use the query-dedicated portion 502 to generate a given query vector, (ii) receive an input based on document data associated with a given document and to use the document-dedicated portion 504 to generate a given document vector, and (iii) such that the proximity between the given document vector and the given query vector is representative of a relevance of the given document to the given query.

As it will become apparent from the present description, the proximity between the given document vector and the given query vector being representative of a relevance of the given document to the given query means that the more the given document vector is spatially close to the given query vector the more the given document is relevant to the given query. By the same token, it should be further noted that the proximity between the given document vector and the given query vector being representative of a relevance of the given document to the given query means that the more the given document vector is spatially far from the given query vector the less the given document is relevant to the given query.

It should be noted that during the given training iteration of the NN 130, the query-dedicated portion 502 and the document-dedicated portion 504 are trained together/simultaneously since both the connections amongst "neurons" of the query-dedicated portion 502 and the connections amongst "neurons" of the document-dedicated portion 504 are adjusted together/simultaneously with each iteration, when needed, based on the comparison between a proximity value (e.g., the proximity value 570) and a relevance score (e.g., the relevance score 310).

As a result, the query-dedicated portion 502 and the document-dedicated portion 504 are trained by conditioning the query-dedicated portion 502 and the document-dedicated portion 504 together/simultaneously to generate respective vectors such that the proximity between these vectors is representative of the relevance score for the query-document pair for which the vectors are generated.

However, it should be noted that, although the query-dedicated portion 502 and the document-dedicated portion 504 are trained together/simultaneously, during the in-use phase of the NN 130, the query-dedicated portion 502 and the document-dedicated portion 504 are used separately by the server 106. How the server 106 is configured to employ the NN 130 during the in-use phase thereof, and more particularly, how the server 106 may use the trained document-dedicated portion 504 and the trained query-dedicated portion 502, will now be described.

In-Use Phase of NN

As previously alluded to, the in-use phase of the NN 130 consists, on the one hand, of the server 106 using the document-dedicated portion 504 and, on the other hand, of the server 106 using the query-dedicated portion 502.

On the one hand, with reference to FIG. 4, the server 106 may use the document-dedicated portion 504 of the NN 130 for generating the plurality of document vectors 402 for the plurality of documents 450.

Each one of the plurality of document vectors 402 may be generated by the document-dedicated portion 504 based on document data associated with a respective one of the plurality of documents 450. Each one of the plurality of document vectors 402 may be generated by the document-dedicated portion 504 similarly to how the document-dedicated portion 504 generates the training document vector 560 (see FIG. 5).

As a result, the server 106 may employ the trained document-dedicated portion 504 of the NN 130 in order to generate a respective one of the plurality of document vectors 402 for a respective one of the plurality of documents 450. The server 106 may store, permanently or temporarily, the NN-generated data 400 in the operational repository 170 for future use thereof.

On the other hand, the server 106 may use the query-dedicated portion 502 of the NN 130 for generating a given query vector for a given query submitted to the server 106 in response to which the server 106 is to provide search results.

For example, the server 106 may be configured to receive the request 180 (see FIG. 1) indicative of a query submitted by the user 101. The server 106 may retrieve query data from the search engine data repository 160 that is associated with the query submitted by the user 101. As a result, the server 106 may employ the trained query-dedicated portion 502 of the NN 130 in order to generate a given query vector for the query submitted by the user 101 based on the query data associated with the query submitted by the user 101.

It is contemplated that query data for the query submitted by the user 101 may be pre-processed and stored in the search engine data repository 160 before receipt of the request 180. In other cases, this query data may be processed upon receipt of the request 180 and provided to the server 106 for further use thereof. In further cases, the query data for the query submitted by the user 101 may be partially pre-processed and stored in the search engine data repository 160 before receipt of the request 180 and partially processed upon receipt of the request 180, without departing from the scope of the present technology.

It should be recalled that the plurality of documents 450 may comprise a very large number of documents. Since the plurality of documents 450 comprises documents that are potentially providable as search results by the search engine, the number of documents in the plurality of documents 450 may be in the thousands, millions or even billions. Therefore, determining an equal number of proximity values by the server 106, for determining which ones of the plurality of documents are potentially the most relevant ones for the query submitted by the user 101, may take an unacceptable amount of time.

Indeed, the user 101 expects a response time for provision of search results to be within seconds from the moment when (s)he submits the query. As a result, determining a very large number of proximity values by the server 106 requires a considerable amount of time and/or a considerable amount of computer resources, which may result in an unacceptable response time for providing search results to the user 101.

Developers of the present technology have devised methods and systems for grouping documents from the plurality of documents 450 and storing these groups of documents in a way that reduces the response time for the query submitted by the user 101. In other words, the developers of the present technology developed methods for storing the plurality of documents 450 as groups of documents in such a way that the selection of documents that are likely to be highly relevant for the query submitted by the user 101 requires a smaller number of operations (e.g., less vector comparisons, less proximity value determinations) than what has been described above.

Broadly speaking, it is contemplated that the server 106 may be configured to determine groups of documents from the plurality of documents 450 and where each group of documents is associated with a given "group vector" and such that the documents within the respective group of documents are associated with document vectors that are in proximity to the respective "group vector". This "group vector" may be used by the server 106 as the "ID" for a respective group of documents as described above. It should be noted that documents grouped under a given "group vector" that is similar/in proximity to the query vector of the query submitted by the user 101 are likely to be highly relevant for the query submitted by the user 101.

As such, instead of comparing the query vector of the query submitted by the user 101 with each one of the plurality of document vectors 402, the server 106 may compare the query vector of the query submitted by the user 101 with the "group vectors", which are fewer in number than the plurality of document vectors 402.

How the server 106 is configured to determine groups of documents from the plurality of documents 450 and the respective "group vectors" (e.g., respective "IDs") will now be described.

Document Grouping

Figure 6:
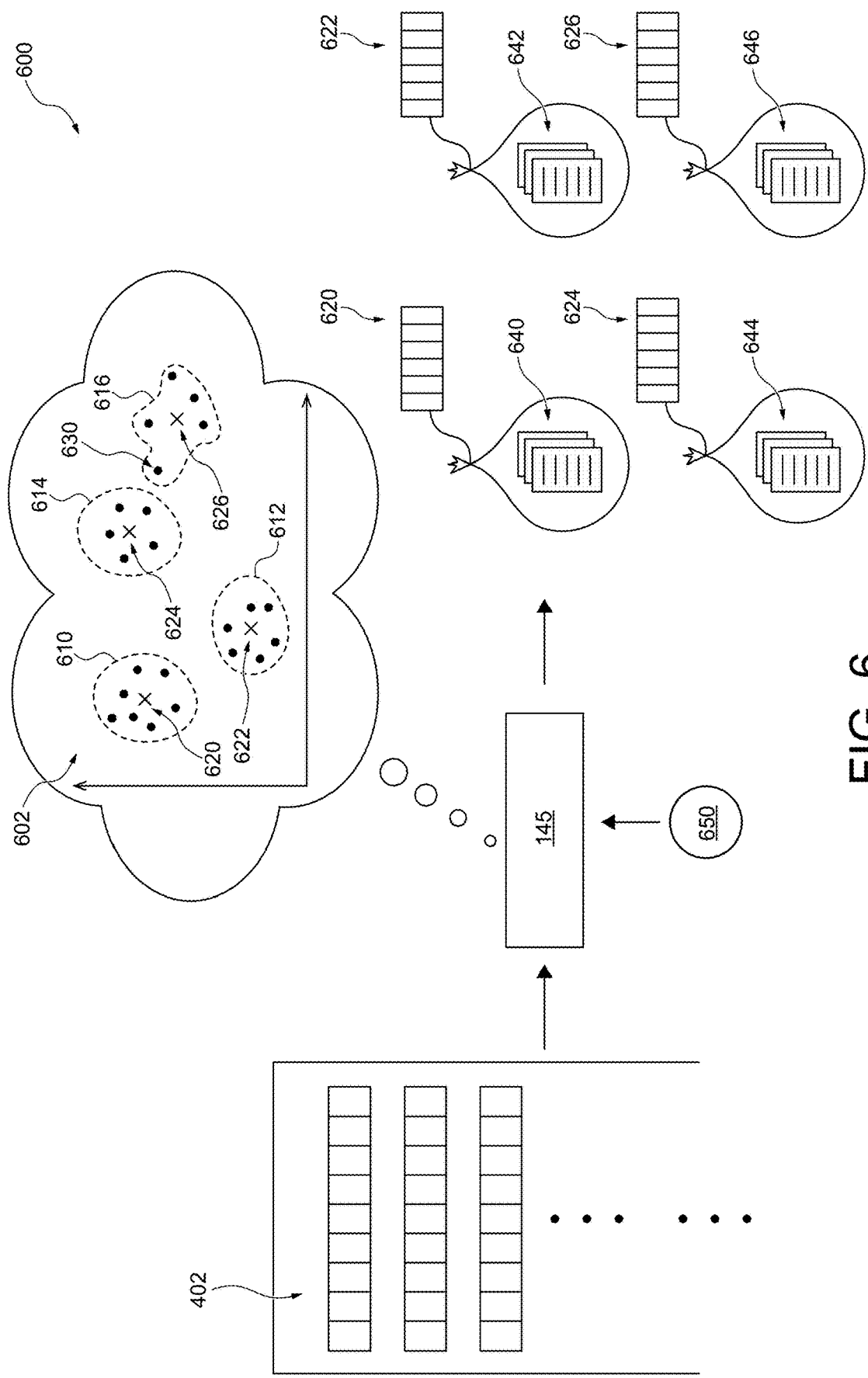
FIG. 6 is a schematic diagram of a grouping procedure for grouping documents by the server of FIG. 1 in accordance with non-limiting embodiments of the present technology.

With reference to FIG. 6, there is depicted a non-limiting example of a grouping procedure 600 that the server 106 may be configured to perform for grouping the plurality of documents 450 into groups. To that end, the server 106 may be configured to employ a K-means-type algorithm 145.

Broadly speaking, the K-means-type algorithm 145 is configured to receive (i) the plurality of document vectors 402 and (ii) a K value 650, and in response, is configured to group the plurality of document vectors 402 into K number of groups of document vectors. It can be said that the server 106 is configured to group the documents from the plurality of documents 450 in accordance with how the plurality of document vectors 402 are grouped into the K number of groups of document vectors by the K-means-type algorithm 145.

In addition, the K-means-type algorithm 145 may be executed by the server 106 in order to determine a respective "group vector" for each of the K number of groups of document vectors. This respective group vector may be used as the "ID" for the respective group of documents.

It should be noted that a graphical representation 602 of how the K-means-type algorithm 145 is configured to determine K number of groups of document vectors and their respective group vectors is depicted in FIG. 6 for illustration purposes only and that the K-means-type algorithm 145 is not actually configured to generate or render the graphical representation 602. Also, in the graphical representation 602, data points are representative of respective ones of the plurality of document vectors 402 and are illustrated as having been mapped based on their proximity amongst each other. It should also be noted that the graphical representation 602 is depicted as a simplified two-dimensional representation for illustration purposes only, when in fact a high-dimensional representation would be necessary for accurately illustrating the plurality of document vectors 402 mapped based on their proximity amongst each other.

Let it be assumed that the K value inputted into the K-means-type algorithm 145 is "4". This means that the server 106 executing the K-means-type algorithm 145 is configured to group the plurality of document vectors 402 into "4" groups of document vectors and where each group of document vectors is associated with a respective group vector.

The server 106 executing the K-means-type algorithm 145 may determine a first group of document vectors 610 associated with a first group vector 620, a second group of document vectors 612 associated with a second group vector 622, a third group of document vectors 614 associated with a third group vector 624, and a fourth group of document vectors 616 associated with a fourth group vector 626.

Once the first, second, third, and fourth group of document vectors 610, 612, 614 and 616 in association with the respective first, second, third, and fourth group vectors 620, 622, 624 and 626 are determined by the server 106 executing the K-means-type algorithm 145, the server 106 may group documents from the plurality of documents 450 in accordance with how the plurality of document vectors 402 has been grouped into the first, second, third and fourth group of document vectors 610, 612, 614 and 616. The server 106 may then associate a given group of documents with a respective group vector that is associated with the respective group of document vectors.

For example, as illustrated in FIG. 6, a first group of documents 640 is associated with the first group vector 620 since the documents in the first group of documents 640 are associated with document vectors from the first group of document vectors 610. A second group of documents 642 is associated with the second group vector 622 since the documents in the second group of documents 642 are associated with document vectors from the second group of document vectors 612. A third group of documents 644 is associated with the third group vector 624 since the documents in the third group of documents 644 are associated with document vectors from the third group of document vectors 614. A fourth group of documents 646 is associated with the fourth group vector 626 since the documents in the fourth group of documents 646 are associated with document vectors from the fourth group of document vectors 616.

In some embodiments of the present technology, the server 106 may perform a group supplementation procedure for supplementing a given group of documents with at least one document that has been otherwise grouped within another given group of documents.

Let's take the example of a given document that is associated with a document vector 630 illustrated in the graphical representation 602. In accordance with the above description, the server 106 is configured to group this given document into the fourth group of documents 646 and to associate this given document with the fourth group vector 626. Indeed, as it can be seen in the graphical representation 602, the document vector 630 is in proximity to the fourth group vector 626 and is part of the fourth group of document vectors 616.

However, as it can also be seen in the graphical representation 602, the document vector 630 is also in proximity to the third group vector 624. It is contemplated that, in some embodiments of the present technology, if the proximity (e.g., vectorial distance) between the third group vector 624 and the document vector 630 is below a pre-determined threshold, the server 106 may be configured to supplement the third group of documents 644 with the given document associated with the document vector 630.

Therefore, it can be said that, in some embodiments of the present technology, the groups of documents determined by the server 106 from the plurality of documents 450 may not be mutually exclusive. This means that, in some embodiments of the present technology, a given document amongst the plurality of documents 450 may be grouped such that the given document is part of at least one group of documents and is associated with at least one respective group vector.

The server 106 is configured to store the first group of documents 640 in association with the first group vector 620, the second group of documents 642 in association with the second group vector 622, the third group of documents 644 in association with the third group vector 624 and the fourth group of documents 646 in association with the fourth group vector 626 in the database system 150.

In some embodiments, instead of storing the plurality of document vectors 402, the server 106 may store in the database system 150 only group vectors associated with respective groups of documents. This may allow the server 106 to store a considerably smaller number of vectors in the database system 150.

As such, in order to retrieve documents that are likely to be highly relevant to the query submitted by the user 101, the server 106 may be configured to determine which of the group vectors is the most similar group vector to the query vector of the query submitted by the user 101. The server 106 may then retrieve documents from the group of documents associated with the most similar group vector.

Storing Shards on Database Servers

Figure 7:
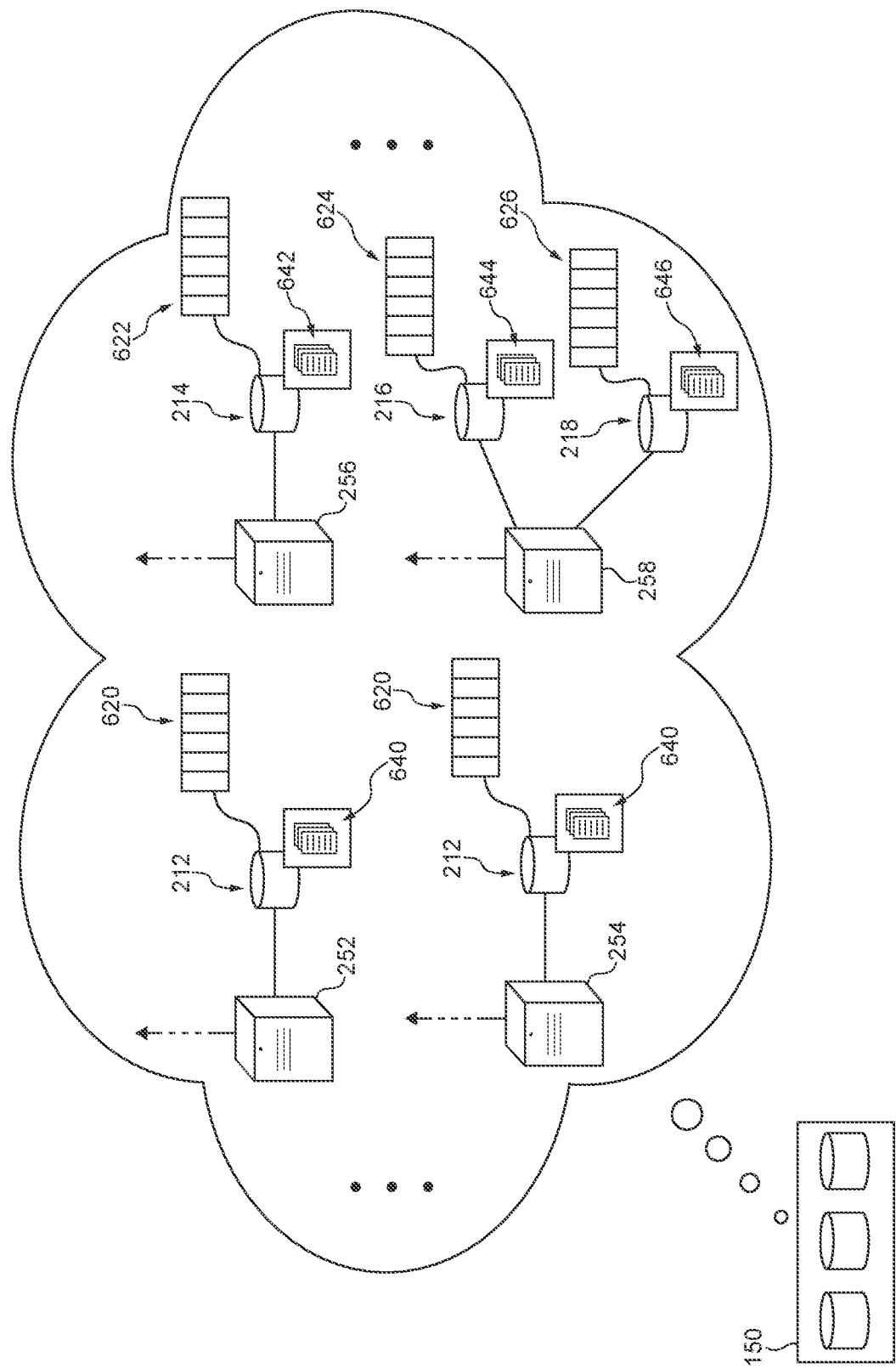
FIG. 7 depicts a schematic diagram of the database system of FIG. 1 in accordance with non-limiting embodiments of the present technology.

In some embodiments, where the database system 150 is configured to host the database 200, the server 106 may store groups of documents as respective shards of the database 200. As illustrated in FIG. 7, the server 106 may store the groups of documents as respective shards of the database 200 on the plurality of database servers 250 of the database system 150.

In a first example, the server 106 may store the first group of documents 640 as the first shard 212 on the first database server 252. It should be noted that the first shard 212 of the database 200 is stored in association with the first group vector 620 (e.g., the "ID" for the first shard 212).

In a second example, the server 106 may store the second group of documents 642 as the second shard 214 on the third database server 256. It should be noted that the second shard 214 of the database 200 is stored in association with the second group vector 622 (e.g., the "ID" for the second shard 214).

As previously alluded to, the server 106 may be configured to keep track of which shard of the database 200 is stored on which database server of the database system 150. For example, while storing the plurality of shards 210 on the plurality of database servers 250, the server 106 may be configured to record and compile the mapping data 140 indicative of (i) the respective group vectors associated with the plurality of shards 210, and (ii) the respective database servers that store shards associated with the respective group vectors.

For example, in this case, the mapping data 140 may be indicative of that (i) the first group vector 620 is associated with the first database server 252 and the second database server 254, (ii) the second group vector 622 is associated with the third database server 256, (iii) the third group vector 624 is associated with the fourth database server 258, and (iii) the fourth group vector 626 is associated with the fourth database server 258.

The mapping data 140 may be used by the server 106 for accessing the database system 150. More particularly, the server 106 may use the mapping data 140 in order to access only some of the plurality of database servers 250, while avoiding access of other ones of the plurality of database servers 250.

For example, when the server 106 generates the query vector for the query submitted by the user 101, the server 106 may be configured to compare this query vector against the group vectors, as explained above, and determine a most similar group vector to the query vector amongst the group vectors. This most similar group vector is associated with a target shard from the plurality of shards 210 which contains documents that are likely to be highly relevant for the query submitted by the user 101.

Once the server 106 determines the most similar group vector (which is the "ID" of the target shard), the server 106 may be configured to consult the mapping data 140 and determine a target database server that stores the target shard. Once the target database server amongst the plurality of database servers 250 is identified, the server 106 may be configured to access the target database server for retrieving documents from the target shard.

It should be noted that while accessing the target database server, the server 106 does not need to access other database servers of the database system 150. For example, based on the comparison between the query vector and the respective group vectors, the group vectors which are further away from the query vector are associated with shards that are less likely to contain highly relevant documents for the given query submitted by the user 101. Therefore, accessing those shards on the other database servers may not be needed. This may allow reducing network traffic and a number of access requests to the database servers of the database system 150.

It is contemplated that the server 106 may be configured to "duplicate" a given shard of the database 200 for storage in the database system 150. For example, the server 106 may duplicate the first shard 212 and store it on the second database server 254 in association with the first group vector 620. This duplication of a given shard of the database 200 may be performed in order to balance the load on database servers that are frequently accessed by the server 106 during operation.

For example, the first group vector 620 may be determined as the most similar vector for a large number of query vectors generated based on respective queries being submitted to the search engine of the server 106. As a result, the first shard 212 may be identified as the target shard for this large number of queries and, therefore, the server 106 may require accessing the first shard 212 a very large number of times. This means that the server 106 may be required to access the first database server 252 hosting the first shard 212 a very large number of times. As a result, the load on the first database server 252 may become high since the first database server 252 is being accessed frequently by the server 106.

Hence, duplicating the first shard 212 that is being frequently accessed by the server 106 and storing the duplicated version thereof on another database server may allow balancing the load on the first database server 252. Having the duplicate of the first shard 212 on the second database server 254 may allow redirecting a portion of accessing requests of the server 106 from the first database server 252 hosting the first shard 212 to the second database server 254 hosting the duplicate of the first shard 212.

It is contemplated that the server 106 may be configured to store more than one shards on a common database server. For example, the server 106 may store (i) the third group of documents 644 as the third shard 216 on the fourth database server 258, and (ii) the fourth group of documents 646 as the fourth shard 218 on the fourth database server 258. It should be noted that the third shard 216 is stored in association with the third group vector 624 while the fourth shard 218 is stored in association with the fourth group vector 626.

In some cases, storing more than one shard on a common database server may be beneficial when the group vectors associated with the more than one shards are in proximity to one another. For example, let it be assumed that the query vector generated for the query submitted by the user 101 is in proximity to the third group vector 624. However, this query vector generated for the query submitted by the user 101 may also be in proximity to the fourth group vector 626. As a result, in some embodiments of the present technology, more than one target shards may be identified by the server 106 and hence, more than one shards may need to be accessed by the server 106 in order to retrieve documents.

As such, in this case, storing more than one shards on a common database server based on how close the respective group vectors are to one another may be beneficial since the total amount of target database servers that are to be accessed by the server 106 may decrease. For example, in this case, since the third shard 216 associated with the third group vector 624 and the fourth shard 218 associated with the fourth group vector 626 are both stored on the fourth database server 258, the server 106 may need to access only one database server (the fourth database server 258) in order to access both the third shard 216 and the fourth shard 218, as opposed to accessing two database servers if the third shard 216 and the fourth shard 218 have been stored on separate database servers.

It is contemplated that once documents are retrieved from the target shards as explained above, these documents may be used by the server 106 in order to generate search results in response to the query submitted by the user 101. For example, the so-retrieved documents from the target shards may be inputted into ranking algorithms of the search engine which may allow the server 106 to select which ones amongst the so-retrieved documents are to be provided as search results and in which order. The server 106 may then generate the response 190 including information indicative of the search results for the query submitted by the user 101.

Figure 8:
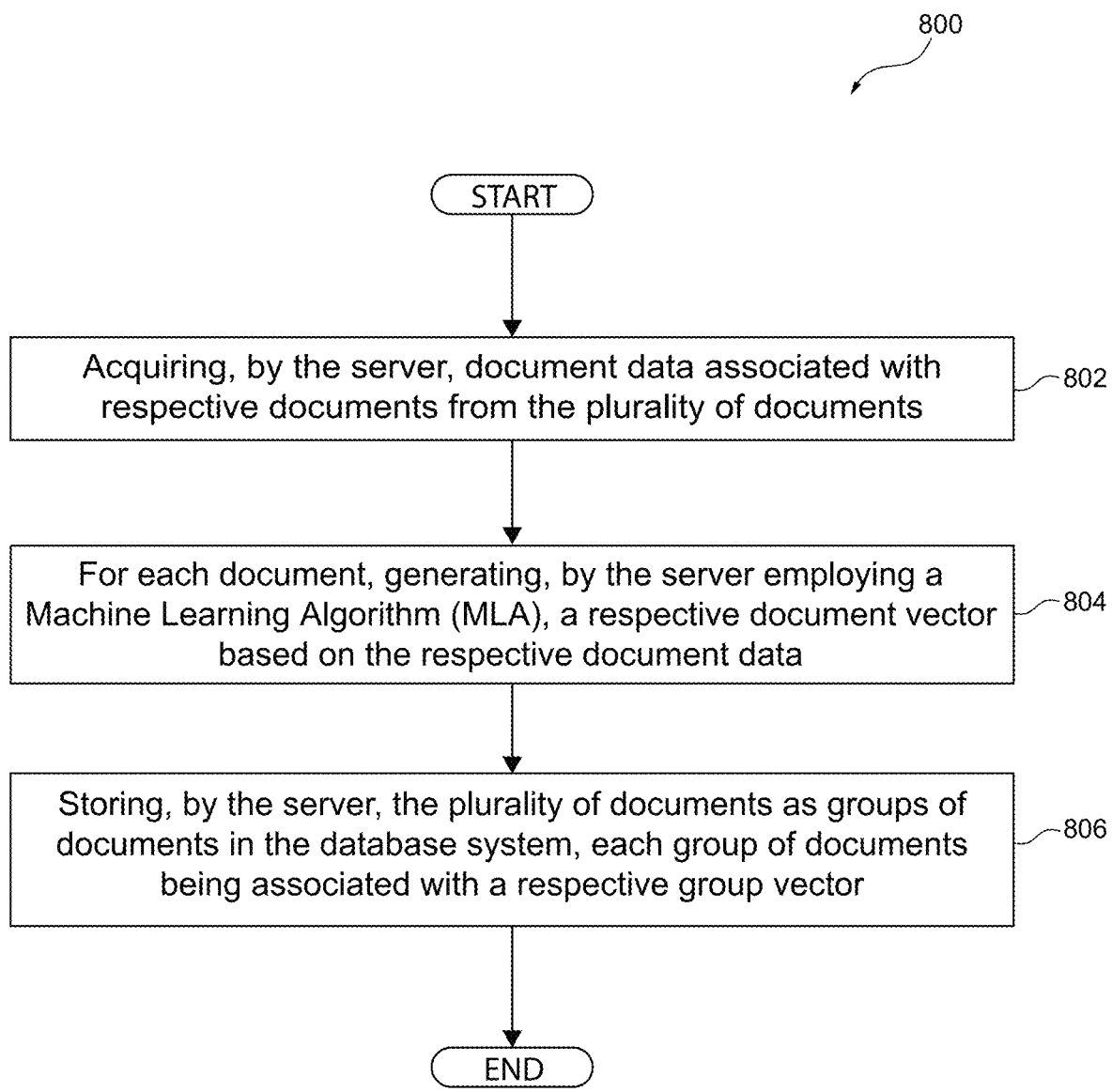
FIG. 8 is a block diagram depicting a flow chart of a method of storing documents executable by the server of FIG. 1 in accordance with non-limiting embodiments of the present technology.

In some embodiments of the present technology, the server 106 is configured to execute a method 800, depicted in FIG. 8, of storing the plurality of documents 450 in the database system 150. The method 800 will now be described.

STEP 802: acquiring, by the server, document data associated with respective documents from the plurality of documents The method begins at step 802 with the server 106 configured to acquire the document data respectively associated with the plurality of documents 450. In one non-limiting example of the present technology, the server 106 may retrieve the document data of the plurality of documents 450 from the search engine data repository 160.

STEP 804: for each document from the plurality of documents, generating, by the server employing a Machine Learning Algorithm (MLA), a respective document vector based on the respective document data The method 800 continues to step 802 with the server 106 configured to employ an MLA (such as, for example, the NN 130), during its in-use phase, for generating the plurality of document vectors 402 as depicted in FIG. 4, for example. The NN 130 is trained prior to being used in its in-use phase.

For example, with reference to FIG. 5, there is depicted a single iteration of the training phase of the NN 130. The NN 130 is trained based on a given training document-query pair associated with a respective relevance score—in this case, the given training document-query pair associated with the respective relevance score is the query-document pair 300 associated with the relevance score 310. As explained above, the relevance score 310 is indicative of a relevance of the document 304 to the query 302.

As described above, the NN 130 is trained such that the proximity value 570 between the document vector 560 and the query vector 550 is representative of the relevance score 310. The proximity value 570 may be a vectorial distance between the document vector 560 and the query vector 550. In other words, the proximity value 570 may be an indication of how spatially close and/or spatially far the document vector 560 is to/from the query vector 550.

In order to condition the NN 130 to generate the training query vector 550 and the training document vector 560 such that the proximity value 570 is representative of the relevance score 310 for the query-document pair 300, the server 106 may be configured to compare the proximity value 570 against the relevance score 310. Based on this comparison, the server 106 may employ different training techniques for adjusting the connections amongst "neurons" of the NN 130 and thereby conditioning the NN 130. For example, the server 106 may employ backpropagation techniques for adjusting the connections amongst "neurons" of the NN 130 based on the situation encountered during the given training iteration of the NN 130.

STEP 806: storing, by the server, the plurality of documents as groups of documents in the database system, each group of documents being associated with a respective group vector The method 800 continues to step 806 with the server 106 configured to store the plurality of documents 450 as groups of documents in the database system 150. Each group of documents stored by the server 106 in the database system 150 is associated with a respective group vector. A given group of documents having documents associated with document vectors that are in a spatial proximity to the respective group vector.

For example, the server 106 may generate a respective document vector from the plurality of document vectors 402 for a respective document from the plurality of documents 450. At step 806, the server 106 may store the plurality of documents 450 as the first group of documents 640, the second group of documents 642, the third group of documents 644 and the fourth group of documents 646 (see FIG. 6).

It should be noted that the first group of documents 640, the second group of documents 642, the third group of documents 644 and the fourth group of documents 646 are associated with the first group vector 620, the second group vector 622, the third group vector 624 and the fourth group vector 626, respectively.

Let's take the example of the first group of documents 640 associated with the first group vector 620. This first group of documents 640 has documents from the plurality of documents 450 that are associated with respective document vectors from the plurality of document vectors 402 that are in a spatial proximity to the first group vector 620.

It should be noted that the spatial proximity between a given document vector of a given document in the first group of documents 640 and another given document vector of another given document in the first group of documents 640 is indicative of the given document of the another given document being similar to one another.

It is contemplated that the server 106 may be configured to determine a respective group vector for each group of documents based on the document vectors associated with the plurality of documents 450. The server 106 may be configured to group the plurality of documents 450 into the first group of documents 640, the second group of documents 642, the third group of documents 644 and the fourth group of documents 646.

For example, in order to group the plurality of documents 450, the server 106 may be configured to execute the K-means-type algorithm 145 onto the plurality of document vectors 402 associated with the plurality of documents 450 thereby determining (i) the first group vector 620, the second group vector 622, the third group vector 624 and the fourth group vector 626 and the respectively associated (ii) the first group of documents 640, the second group of documents 642, the third group of documents 644 and the fourth group of documents 646.

As such, as explained above, It is contemplated that the groups of documents may comprise K number of groups, and where K is a pre-determined number.

In some embodiments, the server 106 may be configured to receive a current query from the device 102 communicatively coupled to the server 106. The current query may be the query submitted by the user 101. The current query is for providing the device 102 with at least one current document that is relevant to the current query.

The server 106 may be configured to receiving the query data associated with the current query. For example, the server 106 may receive the query data from the search engine data repository 160. The server 106 may be configured to employ the query dedicated portion 502 of the NN 130 for generating, for the current query, a current query vector based on the query data associated with the current query as explained above.

The server 106 may also determine a most similar group vector amongst the first group vector 620, the second group vector 622, the third group vector 624 and the fourth group vector 626 to the current query vector. The most similar group vector is associated with a target group of documents amongst the first group of documents 640, the second group of documents 642, the third group of documents 644 and the fourth group of documents 646.

The server 106 may use the mapping data 140 in order to access the database system 150 for retrieving documents from the target group of documents. The server 106 may provide at least one document from the target group of documents in response to the current query to the device 102.

The server 106 may configured to access the database system 150 while not retrieving documents from other groups of documents other than the target group of documents.

It is contemplated that the database system 150 is configured to host the database 200 separated into the plurality of shards 210 (see FIG. 2). In some embodiments. In some embodiments, storing the groups of documents by the server 106 may comprise storing, by the server 106, the groups of documents as respective shards of the database 200 in the database system 150 and where each shard is associated with the respective group vector.

In some embodiments, the database system 150 may comprise the plurality of database servers 250. It is contemplated that storing the groups of documents as the respective shards by the server 106 may comprise storing the plurality of shards 210 of the database 200 on the plurality of database servers 250 of the database system 150.

In some embodiments, a given database server of the plurality of database servers 250 may store more than one of the plurality of shards 210. For example, with reference to FIG. 7, the fourth database server 258 stores the third shard 216 associated with the third group vector 624 and the fourth shard 218 associated with the fourth group vector 626.

In some embodiments, more than one database servers of the plurality of database servers 250 may store a given shard from the plurality of shards 210. For example, the first database server 252 and the second database server 254 both store the first shard 212 (e.g., the first shard 212 and a duplicate of the first shard 212, respectively) in associated with the first group vector 620.

In some embodiments, the plurality of database servers 250 may be physically located in more than one geographic location. It is contemplated that shards stored on respective ones of the plurality of database servers 250 may be selected by the server 106 to be stored thereon based on the physical location of the respective ones of the plurality of database servers 250.

For example, any two database servers of the plurality of database servers 250 that are geographically close may store shards from the plurality of shards 210 having group vectors similar to each other. In another example, any two database servers of the plurality of database servers 250 that are geographically far from each other store shards from the plurality of shards 210 having group vectors that are spatially far from each other (if compared to another group vector of another shard that is stored in a database server that is geographically close to one of the two database servers).

In some embodiments, the server 106 may receiving the current query and the query data associated with the current query and may determine the current query vector for the current query as explained above. The server 106 may determine the most similar group vector to the current query vector based on the mapping data 140 for example. The most similar group vector may be associated with a target shard from the plurality of shards 210. The server 106 may use the mapping data 140 for accessing a target database server from the plurality of database servers 250 for retrieving documents of the target shard. The target database server stores the target shard.

In some embodiments, accessing the target database server may comprise the server 106 not accessing other database servers of the database system 150 other than the target database server.

In some embodiments where there are several replicas of the target database is stored by more than one database server of the plurality of database servers 250, the server 106 may determine the target database server based on a geographical location of the device 102 and the plurality of database servers 250. For example, the device 102 may provide information indicative of the geographic location of the device 102 via the request 180 to the server 106.

The server 106 may be configured to take into account a geographic proximity of the device 102 to geographic locations of the plurality of database servers 250 for determining which database server is the target database server. For example, if there are two database servers that store a common shard and the common shard is determined to be the target shard for access and retrieval of documents therefrom, the server 106 may be configured to select a given one of the two database servers that is geographically closer to the device 102 for retrieving documents therefrom.

It is contemplated that the geographic locations of the plurality of database server 250 may be stored as part of the mapping data 140 by the server 106.

It is contemplated that the NN 130 may comprise the document-dedicated portion 504 and the query-dedicated portion 502 (see FIG. 5). The document-dedicated portion 504 is configured to generate the training document vector based on document data associated with the training document. The query-dedicated portion 502 is configured to generate the training query vector based on query data associated with the training query. The document-dedicated portion 504 and the query-dedicated portion 502 are trained together such that the proximity value between (i) the training document vector and (ii) the training query vector is representative of the relevance score.

In some embodiments of the present technology, it is contemplated that the implementation of the NN 130 may be different from what has been descried above. For example, although the NN 130 has been described as having two portions, it is contemplated that the NN 130 may be implemented as a pair of respective NNs that are suitable to be trained and used similarly to what has been described above with respective to the two portions of the NN 130.

In other embodiments of the present technology, it is contemplated that the NN 130 may be trained by employing other penalty functions to those described hereinabove. For example, in some embodiments of the present technology, the NN 130 may be conditioned by employing ranking-based penalty functions. To better illustrate this, let it be assumed that for a given training query, a ranked list of training documents is available. In this case, during training, the query-dedicated portion 502 may generate a given training query vector for the training query similarly to what has been described above. Also, during training, the document-dedicated portion 504 may generate respective training document vectors for respective training documents similarly to what has been described above. Also, during training, a respective vectorial distance may be determined between the given training query vector and each of the respective training document vectors. The training documents may be ranked based on these respective vectorial distances into a distance-based ranked list of documents. Hence, it can be said that the server 106 may have (i) the given ranked list of training documents and (ii) the distance-based ranked list of these training documents. In some embodiments of the present technology, penalty functions employed by the server 106 for training the NN 130 may be based on a difference between (i) ranks of training documents in the ranked list and (ii) ranks of the respective training documents in the distance-based ranked list.

Additionally, other types of MLAs may be used, instead of a given NN, to perform at least some functionalities of the NN 130. In some embodiments of the present technology, linear-model-type MLAs may be employed instead of the NN 130 for performing at least some functionalities of the NN 130. For example, linear-model-type MLAs may be trained to determine coefficients for respective sub-vectors that, when multiplied by their respective coefficients and when concatenated together, form the respective document vectors and the respective query vectors.

Put another way, in order to generate a given document vector, a given linear-model-type MLA may be configured to determine coefficients for respective sub-vectors generated based on document data associated with the given document, and then, these respective sub-vectors may be multiplied by the respective coefficients and concatenated together for generating the given document vector. By the same token, in order to generate a given query vector, another given linear-model-type MLA may be configured to determine coefficients for respective sub-vectors generated based on query data associated with the given query, and then, these respective sub-vectors may be multiplied by the respective coefficients and concatenated together for generating the given query vector. It should be noted that these given linear-model-type MLAs may be trained to generate the respective coefficients for the respective sub-vectors such that the vectorial distance between the document vector and the query vector (that are generated by concatenating the respective sub-vectors that are multiplied by the respective coefficients) is representative of the relevance score for the respective document-query pair.

It should be apparent to those skilled in the art that at least some embodiments of the present technology aim to expand a range of technical solutions for addressing a particular technical problem encountered by the conventional digital content item recommendation systems, namely selecting and providing for display digital content items that are relevant to the users.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A method of storing a plurality of documents in a database system, the database system being communicatively coupled to a server, the database system comprising a plurality of database servers, the method executable by the server, the method comprising:
   acquiring, by the server, document data associated with respective documents from the plurality of documents;
   for each document from the plurality of documents, generating, by the server employing a Machine Learning Algorithm (MLA), a respective document vector based on the respective document data,
   the MLA having been trained:
      based on a given training document-query pair associated with a respective relevance score, the relevance score being indicative of a relevance of a training document in the given training pair to a training query in the given training pair,
      to generate (i) a training document vector for the training document and (ii) a training query vector for the training query,
      such that a proximity value between (i) the training document vector of the training document and (ii) the training query vector of the training query is representative of the relevance score;
   grouping, by the server, the plurality of documents such that a given group of documents has documents associated with document vectors that are in a spatial proximity to a respective group vector; and
   storing, by the server, the groups of documents such that any two database servers of the plurality of database servers that are geographically close to each other store groups of documents respectively associated with group vectors that are more similar to each other than group vectors of those groups of documents that are stored on any other two database servers of the plurality of database servers that are geographically farther from each other than the two database servers.

2. The method of claim 1, wherein the spatial proximity is indicative of the documents in the given group of documents being similar to one another.

3. The method of claim 1, wherein the method further comprises:
   determining, by the server, the respective group vector for each group of documents based on the document vectors associated with the plurality of documents.

4. The method of claim 1, wherein the groups of documents comprise K number of groups, K being a predetermined number.

5. The method of claim 1, wherein the MLA is a Neural Network (NN).

6. The method of claim 1, wherein the grouping comprises:
   executing, by the server, a K-means-type algorithm onto the document vectors associated with the plurality of documents thereby determining the group vectors and the respectively associated groups of documents of the plurality of documents.

7. The method of claim 1, wherein the method further comprises:
receiving, by the server, a current query from an electronic device communicatively coupled to the server, the current query for providing the electronic device with a current document being relevant to the current query;
receiving, by the server, query data associated with the current query;
for the current query, generating, by the server, a current query vector for the current query based on the query data associated with the current query;
determining, by the server, a most similar group vector to the current query vector amongst the group vectors, the most similar group vector being associated with a target group of documents; and
accessing, by the server, the database system for retrieving documents from the target group of documents.

8. The method of claim 7, wherein the accessing the database system comprises not retrieving documents from other groups of documents other than the target group of documents.

9. The method of claim 1, wherein the database system is configured to host a database separated into a plurality of shards, and wherein the storing the groups of documents comprises:
storing, by the server, the groups of documents as respective shards of the database in the database system, each shard being associated with the respective group vector.

10. The method of claim 9, wherein the database system comprises a plurality of database servers, and wherein the storing the groups of documents as the respective shards comprises:
storing, by the server, the plurality of shards of the database on the plurality of database servers of the database system.

11. The method of claim 10, wherein a given database server of the plurality of database servers stores more than one of the plurality of shards.

12. The method of claim 10, wherein more than one database servers of the plurality of database servers store a given shard from the plurality of shards.

13. The method of claim 10, wherein:
any two database servers of the plurality of database servers that are geographically close store shards having group vectors that are more similar to each other than group vectors of shards that are stored on any other two database servers of the plurality of database servers that are geographically farther from each other than the two database servers.

14. The method of claim 10, wherein the method further comprises:
receiving, by the server, a current query from an electronic device communicatively coupled to the server, the current query for providing the electronic device with a current document being relevant to the current query;
receiving, by the server, query data associated with the current query;
for the current query, generating, by the server, a current query vector for the current query based on the query data associated with the current query;
determining, by the server, a most similar group vector to the current query vector amongst the group vectors, the most similar group vector being associated with a target shard from the plurality of shards; and
accessing, by the server, a target database server from the plurality of database servers for retrieving documents of the target shard, the target database server storing the target shard.

15. The method of claim 14, wherein the accessing the target database server comprises:
not accessing, by the server, other database servers of the database system other than the target database server.

16. The method of claim 14, wherein the method further comprises determining the target database server:
based on a geographical location of the electronic device and the plurality of database servers.

17. A server for storing a plurality of documents in a database system, the database system being communicatively coupled to the server, the database system comprising a plurality of database servers, the server being configured to:
acquire document data associated with respective documents from the plurality of documents;
for each document from the plurality of documents, generate by employing a Machine Learning Algorithm (MLA), a respective document vector based on the respective document data,
the MLA having been trained:
based on a given training document-query pair associated with a respective relevance score, the relevance score being indicative of a relevance of a training document in the given training pair to a training query in the given training pair,
to generate (i) a training document vector for the training document and (ii) a training query vector for the training query,
such that a proximity value between (i) the training document vector of the training document and (ii) the training query vector of the training query is representative of the relevance score;
group, by the server, the plurality of documents such that a given group of documents has documents associated with document vectors that are in a spatial proximity to a respective group vector; and
store, by the server, the groups of documents such that any two database servers of the plurality of database servers that are geographically close to each other store groups of documents respectively associated with group vectors that are more similar to each other than group vectors of those groups of documents that are stored on any other two database servers of the plurality of database servers that are geographically farther from each other than the two database servers.

18. A method of storing a plurality of documents in a database system, the database system being communicatively coupled to a server, the method executable by the server, the method comprising:
acquiring, by the server, document data associated with respective documents from the plurality of documents;
for each document from the plurality of documents, generating, by the server employing a Machine Learning Algorithm (MLA), a respective document vector based on the respective document data, the MLA having been trained:
based on a given training document-query pair associated with a respective relevance score, the relevance score being indicative of a relevance of a training document in the given training pair to a training query in the given training pair, to generate (i) a training document vector for the training document and (ii) a training query vector for the training query, such that a proximity value between (i) the training document vector of the training document and (ii) the training query vector of the training query is representative of the relevance score;

storing, by the server, the plurality of documents as groups of documents in the database system, each group of documents being associated with a respective group vector,
- a given group of documents having documents associated with document vectors that are in a spatial proximity to the respective group vector, wherein the database system is configured to host a database separated into a plurality of shards, and wherein the storing the groups of documents comprises:
- storing, by the server, the groups of documents as respective shards of the database in the database system, each shard being associated with the respective group vector, wherein the database system comprises a plurality of database servers, and wherein the storing the groups of documents as the respective shards comprises:
- storing, by the server, the plurality of shards of the database on the plurality of database servers of the database system, wherein the plurality of database servers are physically located in more than one geographic locations, and wherein any two database servers of the plurality of database servers that are geographically close store shards having group vectors that are more similar to each other than group vectors of shards that are stored on any other two database servers of the plurality of database servers that are geographically farther from each other than the two database servers.

19. The server of claim 17, wherein the database system is configured to host a database separated into a plurality of shards, and wherein when storing the groups of documents, the server is configured to:
- store the groups of documents as respective shards of the database in the database system, each shard being associated with the respective group vector.

20. The server of claim 19, wherein the database system comprises a plurality of database servers, and wherein when storing the groups of documents as the respective shards, the server is configured to:
- store the plurality of shards of the database on the plurality of database servers of the database system.

* * * * *